(12) United States Patent
Park et al.

(10) Patent No.: US 12,335,889 B2
(45) Date of Patent: Jun. 17, 2025

(54) GRADUAL TIMING ADJUSTMENT FOR COMMUNICATION IN NTN

(71) Applicant: QUALCOMM Incorporated, San Diego, CA (US)

(72) Inventors: Changhwan Park, San Diego, CA (US); Liangping Ma, San Diego, CA (US); Xiao Feng Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/048,667

(22) Filed: Oct. 21, 2022

(65) Prior Publication Data

US 2023/0269685 A1 Aug. 24, 2023

Related U.S. Application Data

(60) Provisional application No. 63/312,064, filed on Feb. 20, 2022.

(51) Int. Cl.
*H04W 56/00* (2009.01)
*H04W 84/06* (2009.01)

(52) U.S. Cl.
CPC ........ *H04W 56/0045* (2013.01); *H04W 84/06* (2013.01)

(58) Field of Classification Search
CPC .......................... H04W 56/0045; H04W 84/06
See application file for complete search history.

(56) References Cited

U.S. PATENT DOCUMENTS 8,811,433 B2 * 8/2014 Zhao ................. H04W 56/0005
370/510
10,278,175 B2 * 4/2019 Ahn ..................... H04W 56/004
(Continued)

FOREIGN PATENT DOCUMENTS

WO 2018031966 A1 2/2018

OTHER PUBLICATIONS

Apple: "Discussion on Timing Requirements for NR NTN", 3GPP TSG-RAN WG4 Meeting# 102-e, R4-2203794, 3rd Generation Partnership Project (3GPP), Mobile Competence Centre, 650, Route Des Lucioles, F-06921 Sophia-Antipolis Cedex, France, vol. Ran WG4, No. Electronic Meeting, Feb. 21, 2022-Mar. 3, 2022, 5Pages, Feb. 14, 2022, XP052115200, Section 2.
(Continued)

*Primary Examiner* — Bailor C Hsu
(74) *Attorney, Agent, or Firm* — Procopio, Cory, Hargreaves & Savitch LLP

(57) ABSTRACT

In an aspect of the disclosure, a method, a computer-readable medium, and an apparatus at a user equipment (UE) in a non-terrestrial network (NTN) are provided. The UE may be configured to receive one or more timing advance (TA) commands from an NTN. In response to a transmission timing error between a transmission TA of the UE and a reference timing exceeding a threshold, the UE may be configured to transmit an uplink transmission with a timing change having a total timing adjustment, other than a propagation delay adjustment due to an NTN node position update and a network-controlled common TA value, that satisfies one or more threshold requirements.

30 Claims, 15 Drawing Sheets

(56) References Cited

U.S. PATENT DOCUMENTS

| | | | | |
|---|---|---|---|---|
| 10,624,015 | B2* | 4/2020 | Duan | H04W 36/34 |
| 11,122,633 | B2* | 9/2021 | Bae | H04W 56/0005 |
| 11,457,480 | B2* | 9/2022 | Chai | H04W 72/23 |
| 11,540,324 | B2* | 12/2022 | Sakhnini | H04W 74/0833 |
| 11,805,492 | B2* | 10/2023 | Ma | H04W 56/006 |
| 11,871,370 | B2* | 1/2024 | Lauridsen | H04W 56/0005 |
| 12,035,276 | B2* | 7/2024 | Jung | H04W 76/10 |
| 2019/0174523 | A1 | 6/2019 | Wang et al. | |
| 2022/0070811 | A1* | 3/2022 | Tripathi | H04B 7/1851 |
| 2022/0086780 | A1* | 3/2022 | Tsai | G01S 19/05 |
| 2022/0124660 | A1* | 4/2022 | Cheng | H04W 72/23 |
| 2022/0124795 | A1* | 4/2022 | Wu | H04W 56/0045 |
| 2022/0232503 | A1* | 7/2022 | Cheng | H04W 56/0045 |
| 2022/0232504 | A1* | 7/2022 | Cozzo | H04B 7/18513 |
| 2022/0295225 | A1* | 9/2022 | Keating | H04W 4/029 |
| 2022/0321206 | A1 | 10/2022 | Shrestha et al. | |
| 2022/0322414 | A1* | 10/2022 | Khoshkholgh Dashtaki | H04B 7/18513 |
| 2022/0330191 | A1* | 10/2022 | Shin | G01S 19/256 |
| 2022/0408389 | A1 | 12/2022 | Wang et al. | |
| 2023/0131305 | A1* | 4/2023 | Cozzo | H04W 72/0473 370/329 |
| 2023/0262636 | A1* | 8/2023 | Ma | H04W 56/006 370/350 |
| 2023/0262687 | A1* | 8/2023 | Sayed Hassan | H04W 36/0072 370/331 |
| 2023/0276336 | A1 | 8/2023 | Wu et al. | |
| 2023/0284165 | A1 | 9/2023 | Ye et al. | |
| 2023/0336309 | A1* | 10/2023 | Zhuang | H04L 5/0048 |
| 2023/0337161 | A1* | 10/2023 | Ma | H04W 56/0045 |
| 2023/0396323 | A1 | 12/2023 | Yavuz et al. | |
| 2023/0397032 | A1 | 12/2023 | Yavuz et al. | |
| 2023/0403068 | A1* | 12/2023 | Hu | H04B 7/1853 |
| 2023/0413131 | A1* | 12/2023 | Shrestha | H04W 72/23 |
| 2024/0057002 | A1 | 2/2024 | Sun et al. | |
| 2024/0196362 | A1 | 6/2024 | Yamine | |
| 2024/0204866 | A1 | 6/2024 | Ciochina et al. | |
| 2024/0267863 | A1 | 8/2024 | Hong | |
| 2024/0361469 | A1 | 10/2024 | Dupray et al. | |

OTHER PUBLICATIONS

Asia Pacific Telecom et al., "UI Time and Frequency Synchronization in NTN", 3GPP TSG RAN WG1#104bis-e, R1-2102733, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, 9 Pages, Apr. 7, 2021, XP052177726, Section 2.1.

Intel Corporation: "Discussion on the Remaining Issues For NTN Timing Requirements", 3GPP TSG RAN4 Meeting #102-e, R4-2204419, 3rd Generation Partnership Project (3GPP), Mobile Competence Centre, 650, Route Des Lucioles, F-06921 Sophia-Antipolis Cedex, France, vol. RAN WG4, No. Electronic Meeting, Feb. 21, 2022-Mar. 3, 2022, 5 Pages, Feb. 14, 2022, XP052111767, Section 1, Section 2.

International Search Report and Written Opinion—PCT/US2023/012147—ISA/EPO—May 2, 2023.

3GPP: "RAN1 Chair's Notes", 3GPP TSG RAN WG1 Meeting #105-e, e-Meeting, May 10-27, 2021, Version 12, 145 pages.

3GPP TS 38.133: "3rd Generation Partnership Project, Technical Specification Group Radio Access Network, NR, Requirements for Support of Radio Resource Management (Release 17)", 3GPP TS 38.133, V17.4.0, Dec. 2021, 2884 Pages.

Moderator (Thales): "FL Summary #1 on Enhancements on UL Time and Frequency Synchronization for NR NTN", 3GPP TSG-RAN WG1 Meeting #107-e, R1-2111123, 3rd Generation Partnership Project (3GPP), Mobile Competence Centre, 650, Route Des Lucioles, F-06921 Sophia-Antipolis Cedex, France, vol. 3GPP TSG-RAN WG1 Meeting #107-e, No. R1-2111123, e-Meeting, Nov. 11, 2021-Nov. 19, 2021, 99 Pages, Nov. 15, 2021, XP052097711, p. 30.

Qualcomm Incorporated: "Timing Requirements", 3GPP TSG-RAN WG4 Meeting # 101-bis-e, R4-2200421, 3rd Generation Partnership Project (3GPP), Mobile Competence Centre, 650, Route Des Lucioles, F-06921 Sophia- Antipolis Cedex, France, vol. 3GPP TSG-RAN WG4 Meeting # 101-bis-e, No. R4-2200421, Electronic Meeting, Jan. 17-25, 2022, 6 Pages, Jan. 17, 2022, XP052094829, the whole document.

RAN4 Vice Chair (Intel): "RAN4#101-bis-e RRM Session Meeting Report", 3GPP TSG-RAN WG4 Meeting #101-bis-e, R4-2202424, 3rd Generation Partnership Project (3GPP), Mobile Competence Centre, 650, Route Des Lucioles, F-06921 Sophia-Antipolis Cedex, France, vol. 3GPP TSG-RAN WG4 Meeting # 101-bis-e, No. R4-2202424, Jan. 17-25, 2022, 211 Pages, Jan. 17, 2022, XP052123018, p. 77.

ETSI TS 138 133, "5G; NR; Requirements for Support of Radio Resource Management (3GPP TS 38.133 Version 16.4.0 Release16)", V16.4.0, Aug. 2020, 1465 pages; p. 90, section 7.1.2.1 and p. 91, Table 7.1.2.1-1.

* cited by examiner

GRADUAL TIMING ADJUSTMENT FOR COMMUNICATION IN NTN

CROSS REFERENCE TO RELATED APPLICATION(S)

This application claims the benefit of and priority to U.S. Provisional Application Ser. No. 63/312,064, entitled "Gradual Timing Adjustment for Communication in NTN" and filed on Feb. 20, 2022, which is expressly incorporated by reference herein in its entirety.

TECHNICAL FIELD

The present disclosure relates generally to communication systems, and more particularly, to wireless communication systems with a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirement associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive one or more timing advance (TA) commands from an NTN. The memory and the at least one processor coupled to the memory may be further configured to transmit, in response to a transmission timing error between a transmission TA of the UE and a reference timing exceeding a threshold, an uplink transmission with a timing change having a total timing adjustment, other than a propagation delay adjustment due to an NTN node position update and a network-controlled common TA value, that satisfies one or more threshold requirements.

To the accomplishment of the foregoing and related ends, the one or more aspects may include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
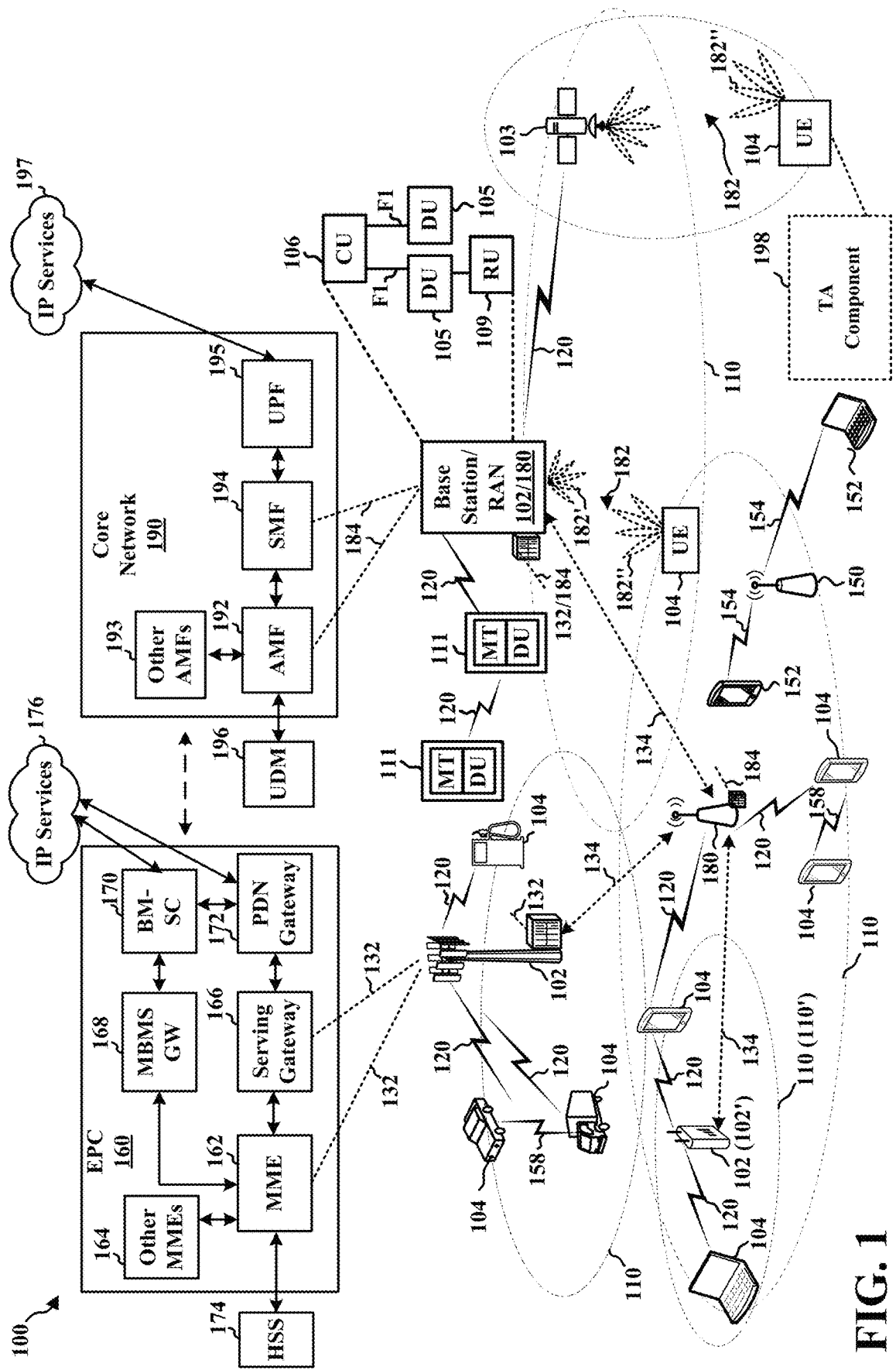
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between or among the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between or among the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between or among the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between or among the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, the base station 102 may communicate with the UE 104 via an NTN device 103, such as a satellite. In some aspects, the NTN device 103 may be a transparent satellite that performs one or more of amplification, filtering, and frequency conversion. In some aspects where the NTN device 103 is a transparent satellite, the NTN device 103 may receive signals from the base station 102 and relay, such as by performing amplify-and-forward relay, the signal to one or more UEs 104. The NTN device 103 may also receive signals from one or more UEs 104 and relay, such as by performing amplify-and forward relay, the signal to the base station 102. In some aspects, the NTN device 103 may also convert the carrier frequency between the input/received signal and the output/transmitted signal. The communication link between the NTN device 103 and the base station 102 may be referred to as a feeder link. In some aspects, the NTN device 103 may be a non-transparent satellite that may be capable of performing one or more aspects performed by the base station 102. In some aspects, the NTN device 103 may be a base station and may be connected to the core network 190.

Figure 2:
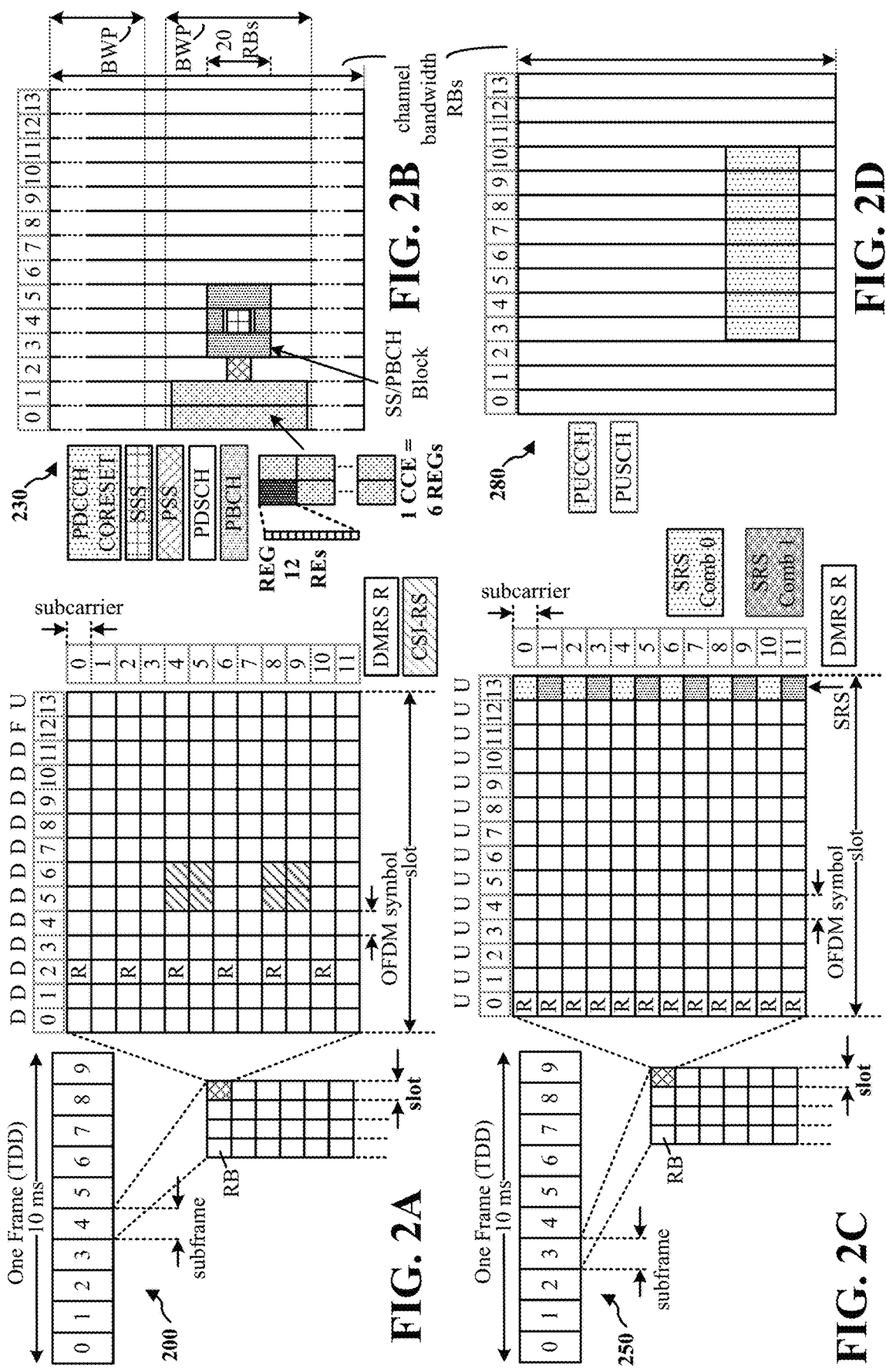
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to 24*15 kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
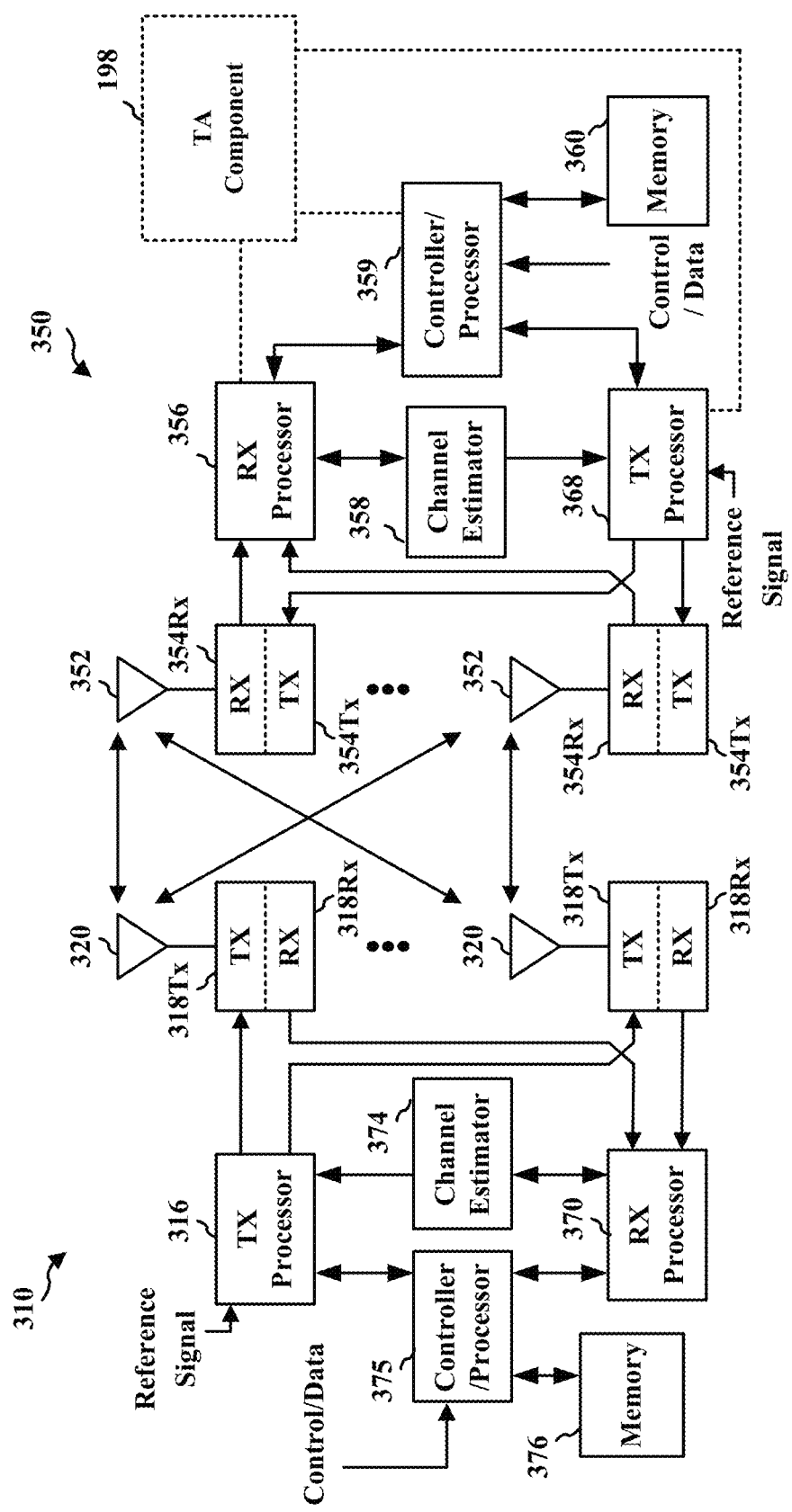
FIG. 3 is a diagram illustrating an example of a network device and user equipment (UE), in accordance with various aspects of the present disclosure.

FIG. 3 is a block diagram of a network device (e.g., a base station or an NTN device such as a satellite) 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the network device 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
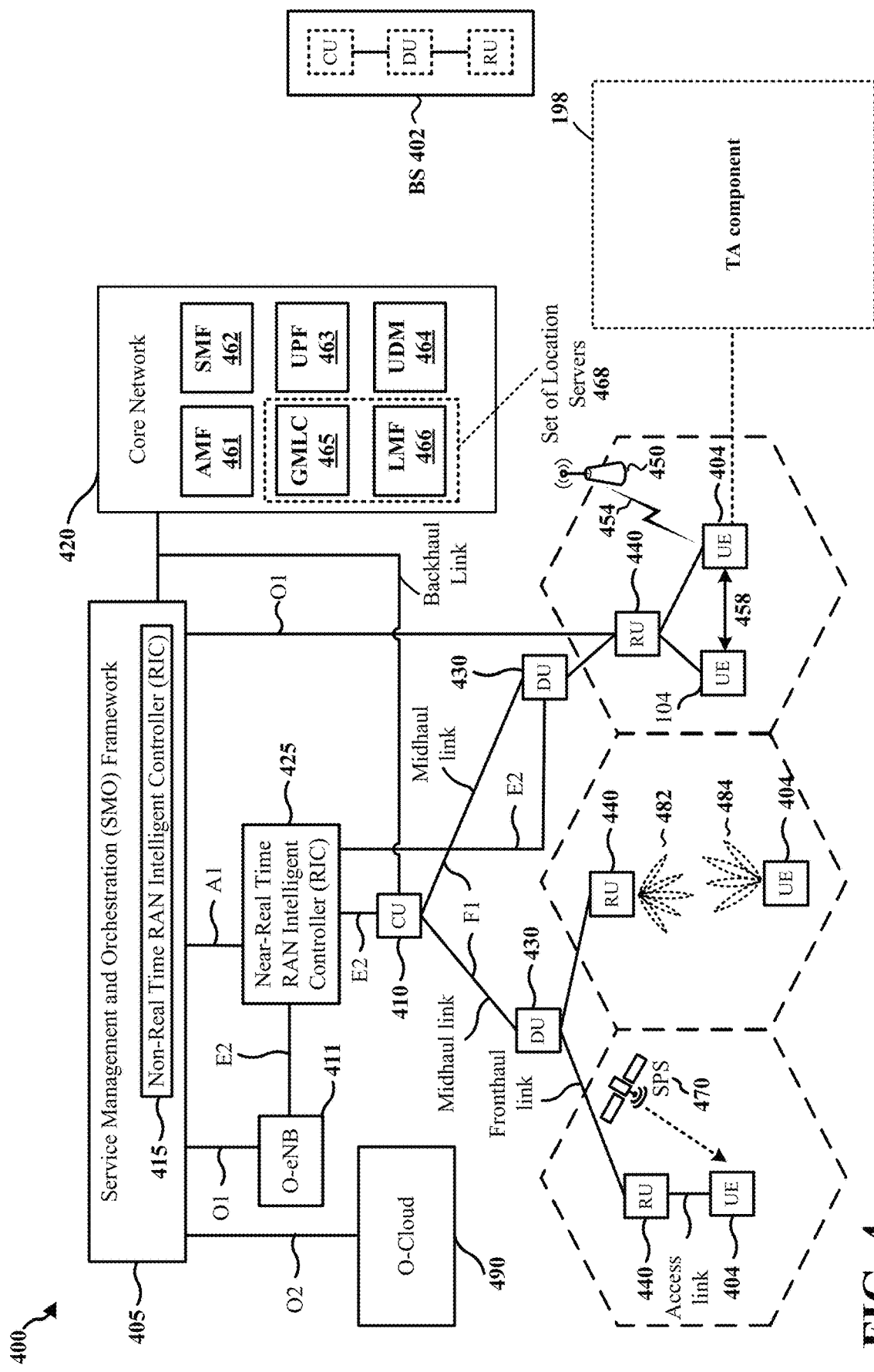
FIG. 4 is a diagram illustrating an example of a wireless communications system and an access network, in accordance with various aspects of the present disclosure.
Figure 15:
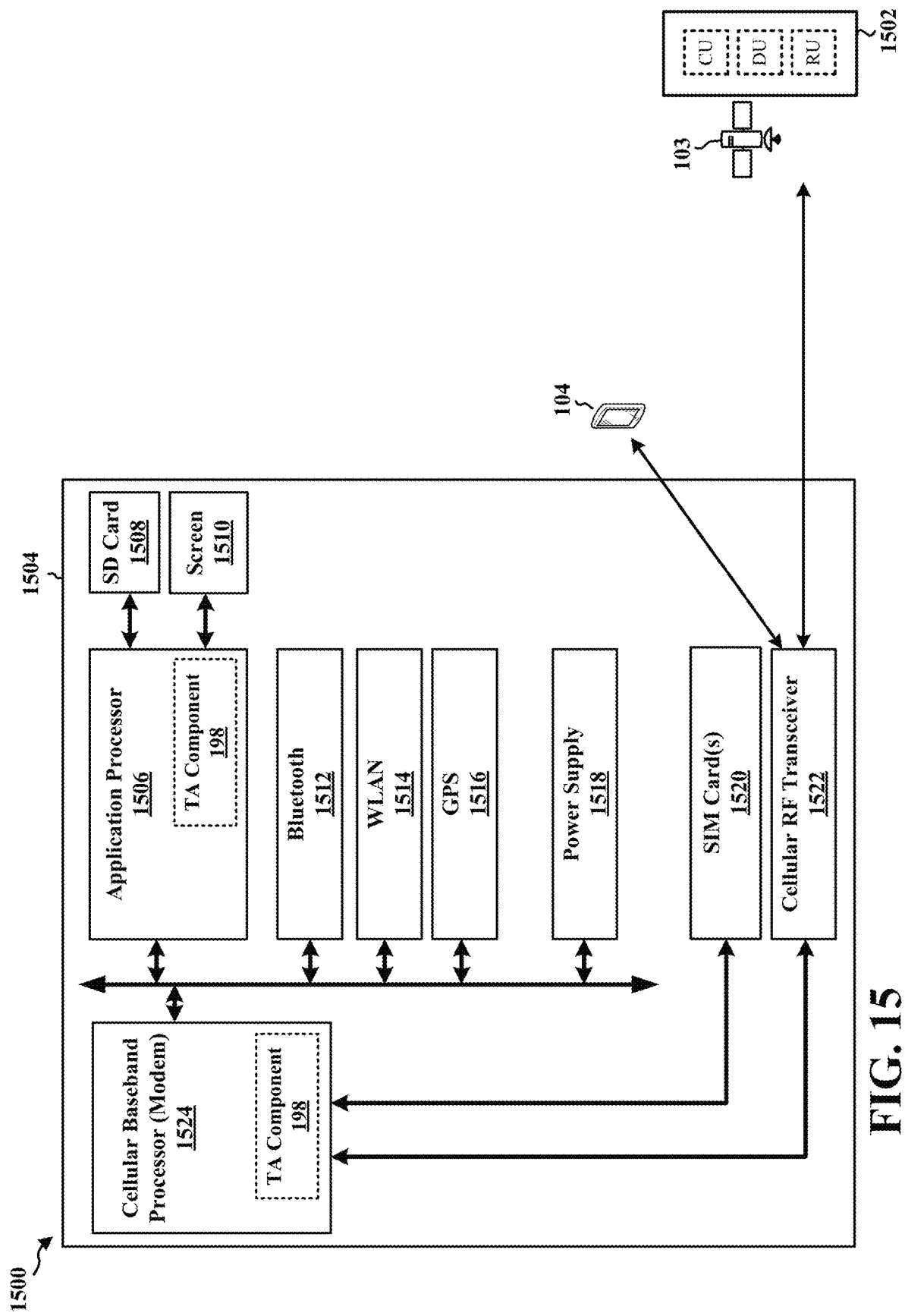
FIG. 15 is a diagram illustrating an example of a hardware implementation for an example apparatus, in accordance with various aspects of the present disclosure.

At least one of the Tx processor 368, the Rx processor 356, and the controller/processor 359 may be configured to perform aspects in connection with TA component 198 of FIG. 1, 4, or 15.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 4 is a diagram 400 illustrating an example of a wireless communications system and an access network. The illustrated wireless communications system includes a disaggregated base station architecture. The disaggregated base station architecture may include one or more CUs 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 404 via one or more radio frequency (RF) access links. In some implementations, the UE 404 may be simultaneously served by multiple RUs 440.

Each of the units, i.e., the CUS 410, the DUs 430, the RUs 440, as well as the Near-RT RICs 425, the Non-RT RICs 415, and the SMO Framework 405, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as an E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 404. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements that may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via $O_1$) or via creation of RAN management policies (such as A1 policies).

At least one of the CU 410, the DU 430, and the RU 440 may be referred to as a base station 402. Accordingly, a base station 402 may include one or more of the CU 410, the DU 430, and the RU 440 (each component indicated with dotted lines to signify that each component may or may not be included in the base station 402). The base station 402 provides an access point to the core network 420 for a UE 404. The base stations 402 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 440 and the UEs 404 may include uplink (UL) (also referred to as reverse link) transmissions from a UE 404 to an RU 440 and/or downlink (DL) (also referred to as forward link) transmissions from an RU 440 to a UE 404. The communication links may use multiple-input and multiple-output (MIMO) antenna technology, including spatial multiplexing, beamforming, and/or transmit diversity. The communication links may be through one or more carriers. The base stations 402/UEs 404 may use spectrum up to Y MHz (e.g., 5, 40, 45, 20, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 404 may communicate with each other using device-to-device (D2D) communication link 458. The D2D communication link 458 may use the DL/UL wireless wide area network (WWAN) spectrum. The D2D communication link 458 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 450 in communication with UEs 404 (also referred to as Wi-Fi stations (STAs)) via communication link 454, e.g., in a 5 GHz unlicensed frequency spectrum or the like. When communicating in an unlicensed frequency spectrum, the UEs 404/AP 450 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-414.25 GHz), and FR5 (414.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 402 and the UE 404 may each include a plurality of antennas, such as antenna elements, antenna panels, and/or antenna arrays to facilitate beamforming. The base station 402 may transmit a beamformed signal 482 to the UE 404 in one or more transmit directions. The UE 404 may receive the beamformed signal from the base station 402 in one or more receive directions. The UE 404 may also transmit a beamformed signal 484 to the base station 402 in one or more transmit directions. The base station 402 may receive the beamformed signal from the UE 404 in one or more receive directions. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

The base station 402 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 402 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 420 may include an Access and Mobility Management Function (AMF) 461, a Session Management Function (SMF) 462, a User Plane Function (UPF) 463, a Unified Data Management (UDM) 464, one or more location servers 468, and other functional entities. The AMF 461 is the control node that processes the signaling between the UEs 404 and the core network 420. The AMF 461 supports registration management, connection management, mobility management, and other functions. The SMF 462 supports session management and other functions. The UPF 463 supports packet routing, packet forwarding, and other functions. The UDM 464 supports the generation of authentication and key agreement (AKA) credentials, user identification handling, access authorization, and subscription management. The one or more location servers 468 are illustrated as including a Gateway Mobile Location Center (GMLC) 465 and a Location Management Function (LMF) 466. However, generally, the one or more location servers 468 may include one or more location/positioning servers, which may include one or more of the GMLC 465, the LMF 466, a position determination entity (PDE), a serving mobile location center (SMLC), a mobile positioning center (MPC), or the like. The GMLC 465 and the LMF 466 support UE location services. The GMLC 465 provides an interface for clients/applications (e.g., emergency services) for accessing UE positioning information. The LMF 466 receives measurements and assistance information from the NG-RAN and the UE 404 via the AMF 461 to compute the position of the UE 404. The NG-RAN may utilize one or more positioning methods in order to determine the position of the UE 404. Positioning the UE 404 may involve signal measurements, a position estimate, and an optional velocity computation based on the measurements. The signal measurements may be made by the UE 404 and/or the base station 402 serving the UE 404. The signals measured may be based on one or more of a satellite positioning system (SPS) 470

(e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 404 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 404 may be referred to as IoT devices (e.g., parking meter, gas pump, toaster, vehicles, heart monitor, etc.). The UE 404 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIGS. 1 and 4, in some aspects, the UE 104 or the UE 404 may include a TA component 198. In some aspects, the TA component 198 may be configured to gradually adjust a TA in response to detecting a timing transmission error for communication in NTN. The TA component 198 may be configured to receive one or more TA commands from an NTN. The TA component 198 may be configured to transmit, in response to a transmission timing error between a transmission TA of the UE and a reference timing exceeding a threshold, an uplink transmission with a timing change having a total timing adjustment, other than a propagation delay adjustment due to an NTN node position update and a network-controlled common TA value, that satisfies one or more threshold requirements. Although the following description may be focused on TA commands from an NTN, the concepts described herein may be applicable to TA commands from any network node having a high altitude (e.g. above 20 meters), such as a geostationary earth orbit (GEO) device, a medium earth orbit (MEO) device, a low earth orbit (LEO) device, an airplane device, a balloon device, or an unmanned aerial vehicle (UAV) device. The NTN may be an Internet of Things (IoT) NTN. Although the following description may be focused on 5G NR, the concepts described herein may be applicable to other similar areas, such as LTE, LTE-A, CDMA, GSM, IoT communication, and other wireless technologies.

An NTN network utilizing non-terrestrial network nodes (e.g., satellites) may be integrated in a wireless communication system, such as a 5G communication system to facilitate communication between or among a base station, or a RAN, and a UE. For example, in some aspects, a transparent satellite that performs amplification, spatial filtering, or frequency conversion may relay communication transmitted from a base station to UEs. In another aspect, a non-transparent satellite may serve as at least part of a 5G base station. NTN may provide service coverage to areas where terrestrial cellular service is not available. The network device that a UE may connect to over the air may be a satellite, balloon, drones, or the like.

Figure 5A:
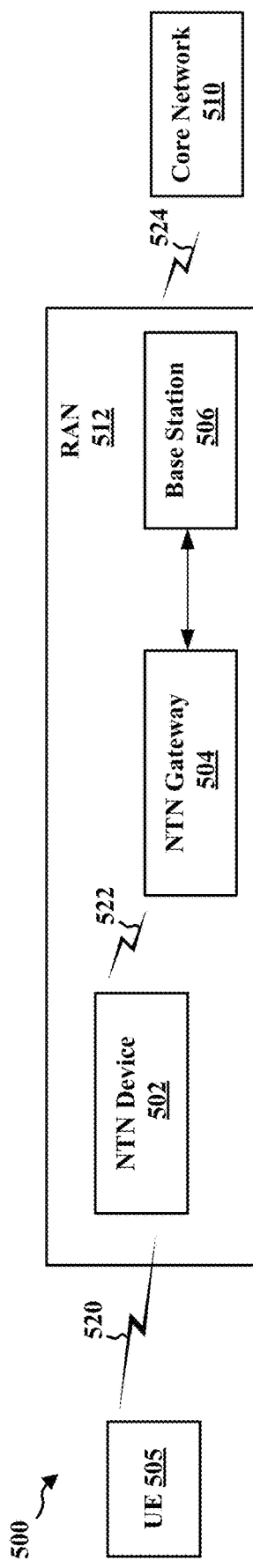
FIGS. 5A, 5B, and 5C illustrate example aspects of a network architecture that supports communication via an NTN device, in accordance with various aspects of the present disclosure.

FIG. 5A illustrates an example network architecture 500 capable of supporting NTN access, e.g., using 5G NR, as presented herein. Although the aspects are described using the example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 4G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN).

The base station 506 may be a network node that corresponds to the network device 310 of FIG. 3. The network architecture 500 is illustrated as further including a core network 510. In some aspects, the core network 510 may include a number of Fifth Generation (5G) networks including 5G Core Networks (5GCNs) and may correspond to the core network 190 described in connection with FIG. 1. The core network 510 may be public land mobile networks (PLMN). In some aspects, the core network may be 5GCNs.

Permitted connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the example of FIG. 5A includes one UE 505, it should be understood that many UEs (e.g., hundreds, thousands, millions, etc.) may utilize the network architecture 500. For example, a plurality of UEs may connect with the NTN device 502 via a plurality of service links similar to service link 520. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a network entity, a gNB, a "satellite node", a satellite NodeB (sNB), "satellite access node", etc. The base station 506 may not be the same as terrestrial network gNBs, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary earth orbit (non-GEO) devices) and associated mobility of the UE 505. The base station 506 may assist in the handover (or transfer) of the NTN device 502 between different NTN gateways or different base stations. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU), such as the example CU 106 of FIG. 1, and the NTN gateway 504 may include or act as Distributed Unit (DU), such as the example DU 105 of FIG. 1. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device.

The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 5B:
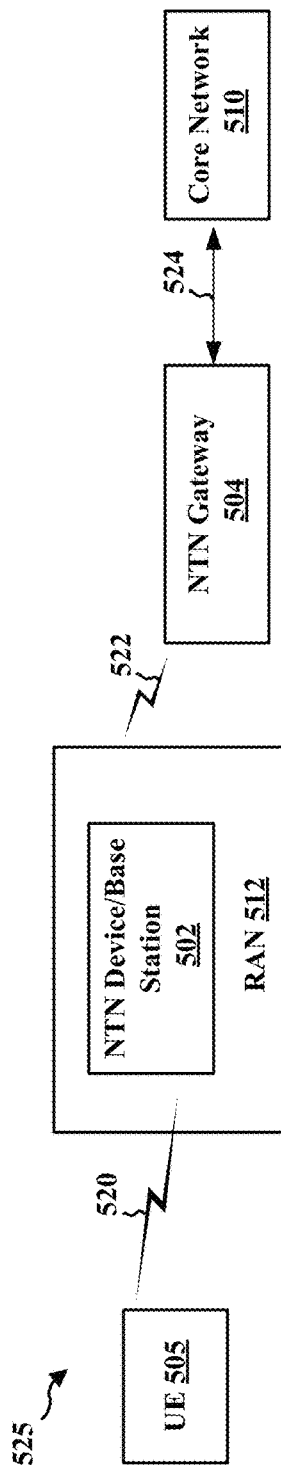

FIG. 5B shows a diagram of a network architecture 525 capable of supporting NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The on-board base station may be a network node that corresponds to the network device 310 in FIG. 3. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/ base station may assist in the handover (or transfer) of the UE 505 between different NTN gateways and different control networks. The NTN device 502/base station may hide or obscure specific aspects of the NTN device 502/base station from the core network 510, e.g., by interfacing to the core network 510 in the same way or in a similar way to a terrestrial network base station. The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low Earth orbit (LEO) devices, the NTN device 502/base station may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

Figure 5C:
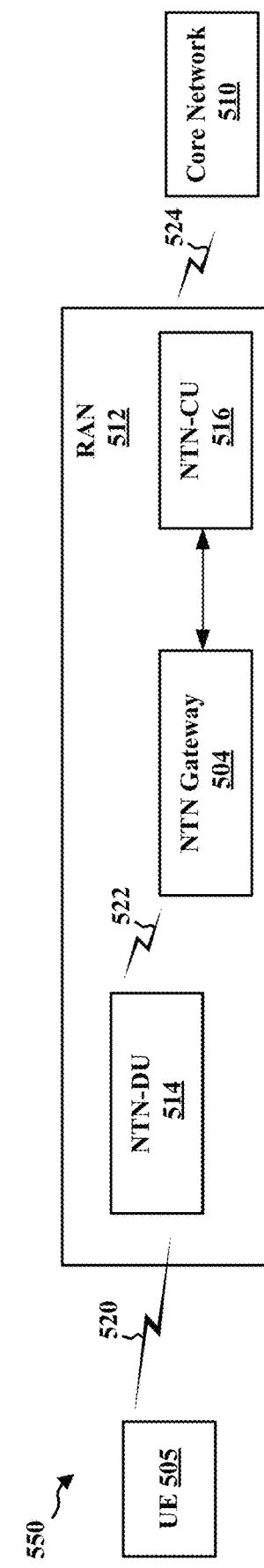

FIG. 5C shows a diagram of a network architecture 550 capable of supporting NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU), such as the CU 106 of FIG. 1, and a Distributed Unit (DU), such as the DU 105 of FIG. 1. In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the network device 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (F1AP), and together may perform some or all of the same functions as the base station 506 or the NTN device 502/base station as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the core network 510, e.g., by interfacing to the core network 510 in the same way or in a similar way to a terrestrial network base station.

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514. In some aspects, the NTN device may correspond to a high altitude platform system (HAPS) that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. For example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 6:
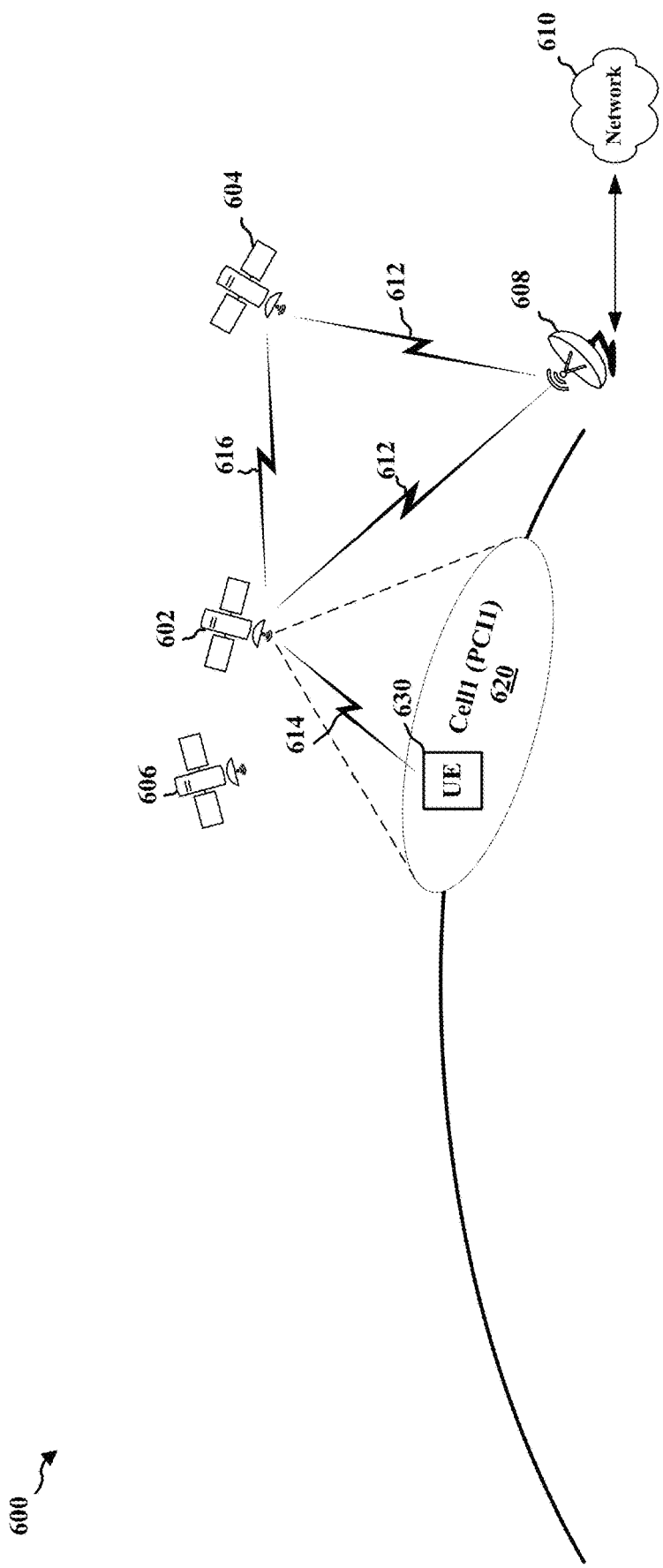
FIG. 6 illustrates an example of an NTN configuration, in accordance with various aspects of the present disclosure.

FIG. 6 illustrates an example of an NTN 600 configuration. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as a LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN 600 may include an NR-NTN. The example of FIG. 6 provides that the NTN 600 may include a first NTN device 602, a second NTN device 604, a third NTN device 606, an NTN gateway 608, a data network 610, and a UE 630 within a cell coverage of the first NTN device 602. In some aspects, the UE 630 may include IoT devices, and the UE may be connected to the NTN 600 for wireless communication.

The NTN gateway 608 may be one of one or more NTN gateways that may connect the NTN 600 to a public data network. In some examples, the NTN gateway 608 may support functions to forward a signal from the NTN device to a Uu interface, such as an NR-Uu interface. In other examples, the NTN gateway 608 may provide a transport network layer node, and may support transport protocols, such as acting as an IP router. A satellite radio interface (SRI) may provide IP trunk connections between the NTN gateway 608 and the NTN device to transport NG or F1 interfaces, respectively. One or more geosynchronous equatorial orbit (GEO) devices (e.g., which may be referred to herein as the first NTN device 602, the second NTN device 604, or the third NTN device 606) may be fed by the NTN gateway 608, and the one or more NTN devices may be deployed across the satellite targeted coverage, which may correspond to regional coverage or even continental coverage. A non-GEO device may be served successively by one or more NTN gateways at a time, and the NTN 600 may be configured to provide service and feeder link continuity between the successive serving NTN gateways with time duration to perform mobility anchoring and handover.

The first NTN device 602, including spaceborne vehicles or airborne vehicles, may communicate with the data network 610 through a feeder link 612 established between the first NTN device 602 and the NTN gateway 608 in order to provide service to the UE 630 within the cell coverage, or a field-of-view of an NTN cell 620, of the first NTN device 602 via a service link 614. The feeder link 612 may include a wireless link between an NTN gateway and an NTN device. The service link 614 may refer to a radio link between an NTN device (e.g., the first NTN device 602) and the UE 630. As described in connection with FIG. 1, the first NTN device 602 may use one or more directional beams, e.g., beamforming, to exchange communication with the UE 630. A beam may refer to a wireless communication beam generated by an antenna on-board an NTN device.

In some examples, the UE 630 may communicate with the first NTN device 602 via the service link 614. The second NTN device 604 may relay the communication for the first NTN device 602 through an inter-satellite link (ISL) 616, and the second NTN device 604 may communicate with the data network 610 through the feeder link 612 established between the second NTN device 604 and the NTN gateway 608. The ISL links may be provided between a constellation of satellites and may involve the use of transparent payloads on-board the NTN devices. The ISL may operate in an RF frequency or an optical band.

In the illustrated example of FIG. 6, the first NTN device 602 may provide the NTN cell 620 with a first physical cell ID (PCI) ("PCI1"). In some examples, a constellation of satellites may provide coverage to the NTN cell 620. For example, the first NTN device 602 may include a non-GEO device that does not appear stationary with respect to the Earth. As such, a satellite constellation (e.g., one or more satellites) may be configured to provide coverage to the NTN cell 620. For example, the first NTN device 602 and the third NTN device 606 may be part of a satellite constellation that provides coverage to the NTN cell 620.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Wireless communication between a UE and a base station may experience a propagation delay between the time, e.g., between the time that a UE transmits an uplink transmission and the time that the uplink transmission is received at the base station. In some aspects, different UEs experience different propagation delays, and that may cause time misalignment of the uplink transmissions from different UEs at the base station. Such misalignment, if large enough, may cause interferences among uplink transmissions, e.g., transmissions based on OFDM. The base station may provide the UE with a timing advance command that indicates for the UE to adjust the timing of uplink transmissions to compensate for the propagation delay. Thus, the network may use a timing advance command to control uplink signal transmission timing. The network may measure the time difference between uplink reception and the subframe time and may send a timing advance command to UE to change the timing of an uplink transmission, such as PUSCH, PUCCH, and/or SRS, to provide for reception at the base station that is better aligned with the subframe timing at the network side. For example, if the PUSCH/PUCCH/SRS arrives at the network too early, the network may indicate for the UE to transmit the signal later by an indicated amount. If the PUSCH/PUCCH/SRS arrives at the network too late, the network may indicate for the UE to transmit the uplink signal earlier by an indicated amount.

The total timing advance ($T_{TA}$, or transmission timing advance) applied by a UE communicating with an NTN may be based on:

$$T_{TA}=(N_{TA}+N_{TA,UE\text{-}specific}+N_{TA,common}+N_{TA,offset})\times T_C$$

$N_{TA}$ may include a cumulative timing advance value based on an accumulation of TA commands from the network. $N_{TA}$ may equal 0 for a PRACH transmission and may be updated based on a TA Command field in random access msg2/msgB and/or in a MAC-CE TA command. The network provided timing advance may be referred to as a closed-loop timing advance. A network entity may provide an $N_{TA}$ value to a UE via an NTN device, such as the BS 102 to the UE 104 via NTN device 103 of FIG. 1, or NTN gateway 608 to the UE 630 via NTN gateway 608.

$N_{TA,UE\text{-}specific}$ may include a UE self-estimated timing advance amount that pre-compensates for a service link delay, e.g., a propagation delay between a UE and a satellite of the NTN. An example service link 614 is illustrated in FIG. 6. The UE may estimate this TA based on its location (e.g., obtained using a global navigation satellite system (GNSS)) relative to an NTN device (e.g. a satellite) of an NTN. In other words, the UE may estimate this TA based on an estimate of the service link distance and an estimate of the feeder link distance. A satellite location may be provided by an ephemeris. Such a TA calculated by the UE may be referred to as an open-loop timing advance. A UE may calculate its $N_{TA,UE\text{-}specific}$ value without first performing a GNSS fix, which may result in an estimated $N_{TA,UE\text{-}specific}$ value having a timing error based on the last known location of the UE instead of a present location of the UE.

$N_{TA,common}$ may include a network-controlled common TA, and may include a timing offset considered necessary by the network. This common TA may be based on a delay at a feeder link, e.g., between a satellite and base station. FIG. 6 illustrates an example of a feeder link 612. In some aspects, the common TA may be zero. An $N_{TA,common}$ value may also be referred to as an open-loop timing advance together with the $N_{TA,UE\text{-}specific}$ value. A network entity may provide an $N_{TA,common}$ value to a UE via an NTN device, such as the BS 102 to the UE 104 via NTN device 103 of FIG. 1, or NTN gateway 608 to the UE 630 via NTN gateway 608. In some aspects, $N_{TA,common}$ may be computed by the UE based on a model constructed by the UE using one or more parameters (e.g., coefficients in a Taylor series) signaled by the network. In some aspects, the signaling of the parameters may be via system information.

$N_{TA,offset}$ may include a fixed offset used to calculate the timing advance. In some aspects, $N_{TA,offset}$ may be used to ensure coexistence with LTE. A network entity may provide an $N_{TA,offset}$ value to a UE via an NTN device, such as the BS 102 to the UE 104 via NTN device 103 of FIG. 1, or NTN gateway 608 to the UE 630 via NTN gateway 608.

$T_C$ may equal $1/(480000\times 4096)$ seconds.

A UE may apply the timing advance in an idle RRC state (e.g., an "RRC_IDLE" state), an inactive RRC state (e.g., an "RRC_INACTIVE" state), or in an RRC connected state (e.g., an "RRC_CONNECTED" state). A UE may be in a connected state (e.g., an "RRC_CONNECTED" state) or an inactive state (e.g., an "RRC_INACTIVE" state) when the UE has established an RRC connection with a base station. If an RRC connection has not been established, the UE is in an idle state (e.g., an "RRC_IDLE" state). While in the idle state, the UE and the base station may establish an RRC connection and the UE may transition to the connected state. While in the connected state, the UE and/or base station may release the RRC connection and the UE may transition to the idle state. In other examples, while in the connected state, the UE and/or the base station may release with suspend the RRC connection and the UE may transition to the inactive state. While in the inactive state, the UE and/or the base station may resume the RRC connection and the UE may transition to the connected state. In other examples, while in the inactive state, the UE and/or the base station may release the RRC connection and the UE may transition to the idle state.

In some aspects, the timing advance command from the network may become outdated, e.g., based on the amount of time since the TA command was received by the UE. In some aspects, the timing advance calculation may lead to a double adaptation in which a propagation delay is addressed by the network controlled TA (e.g., the accumulated TA based on the TA commands from the network, $N_{TA}$) that attempts to mitigate the UE's use of a prior GNSS fix, which becomes duplicative when the UE performs a new GNSS fix and updates the self-estimated timing advance value $N_{TA,UE\text{-}specific}$. Double adaption may be also called a double correction.

Figure 7:
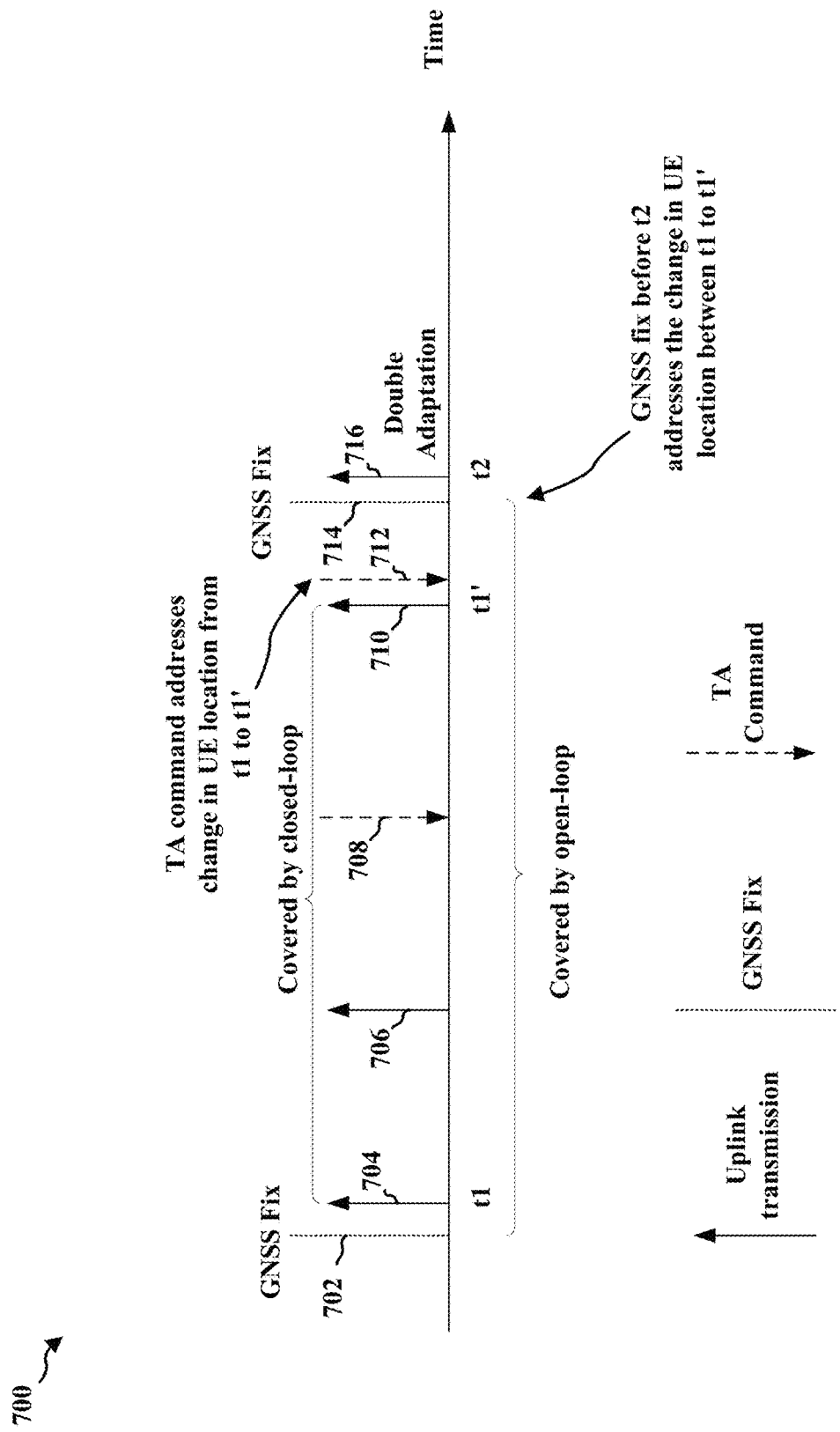
FIG. 7 illustrates a timing diagram illustrating example aspects of timing advance calculation in accordance with aspects presented herein.

FIG. 7 illustrates a timing diagram 700 that shows an example of a double adaptation for a timing advance. The UE may be configured to perform a GNSS fix 702 and use the GNSS location reading resulting from the GNSS fix and the satellite location to determine $N_{TA,UE\text{-}specific}$. The UE transmits an uplink transmission 704 at time t1 and uplink transmission 710 at time t1' based, at least in part, on the $N_{TA,UE\text{-}specific}$ for the GNSS fix 702. The uplink transmissions 704 and 706 may also have a timing advance based on accumulated timing advance commands (e.g., $N_{TA}$), $N_{TA,Common}$, and/or $N_{TA}$,Offset. The network provides a timing advance commands 708 and 712, based on the UE's prior transmissions. For example, the timing advance command 708 and/or 712 may be based on a propagation delay observed for uplink transmissions 704, 706, or 710 that are based on the GNSS fix 702. Thus, the timing advance commands 708 or 712 may address the movement of the UE relative to the satellite after the GNSS fix 702. The UE applies an accumulation of the timing advance commands 708, 712, etc. when transmitting uplink transmissions. For example, the uplink transmissions 704 and 706 may have a first value $N_{TA1}$, and the uplink transmission 710 may have an accumulated value $N_{TA}1$+timing advance command 708. The uplink transmission 716 may have an accumulated value $N_{TA}1$+timing advance command 708+timing advance command 712. The closed-loop timing advance based on the accumulated timing advance commands from the network provides a timing advance that addresses the movement of the UE relative to the satellite between GNSS fixes. The UE performs another GNSS fix 714, and updates the self-estimated timing advance (e.g., open-loop timing advance value) $N_{TA,UE\text{-}specific}$ based on the UE's location relative to the satellite based on the GNSS fix 714. Thus, the self-estimated timing advance $N_{TA,UE\text{-}specific}$ also addresses the UE's movement between the GNSS fix 702 and the GNSS fix 714. The addition of the accumulated ($N_{TA}+N_{TA,UE\text{-}specific}$) provides for a double adaptation (which may be also called double correction) based on the UE's movement relative to the satellite. As time t2, when the uplink transmission 716 is transmitted, is close to time t1' when the uplink transmission 710 is transmitted and to the GNSS fix 714, the self-estimated timing advance ($N_{TA,UE\text{-}specific}$) based on the GNSS fix 714 captures the change in location between t1 and t1' in addition to the timing advance commands 708, 712 from the network that address the change in location. FIGS. 9A, 9B, 10A, and 10B illustrate examples of the time periods between GNSS fixes, timing commands from the network, and uplink transmissions.

An NTN deployment may be associated with long delays (e.g., a long latency and/or a long RTT) relative to a terrestrial network due at least in part to the long distance between the UE and the NTN node. Furthermore, the delay in a transparent satellite deployment may exceed the delay in a regenerative satellite deployment because any communication between the UE and a base station or gateway may travel from the UE to the NTN node over a service link and then from the NTN node to the base station or gateway over a feeder link, where both the service link and the feeder link may be associated with a longer delay than a terrestrial network. Accordingly, in an NTN, a UE may generally apply a TA to an uplink transmission performed in an RRC idle or inactive state and/or an uplink transmission performed in an RRC connected state. For example, a TA applied by a UE may have a value that corresponds to a length of time that a signal takes to travel from the base station to the UE and back to the base station (which may be included in the NTN node in a regenerative satellite deployment or a gateway in a transparent satellite deployment). For example, the TA applied by the UE may correspond to an RTT between the base station and the UE because the TA is relative to a downlink frame at the UE, which is already a single-trip delay relative to the same downlink frame at the base station. In this way, the TA applied by the UE may align uplink reception timing implemented at the base station to enable communication with different UEs that may be located at various distances from the base station.

In some cases, the UE may self-estimate the open-loop $N_{TA,UE\text{-}specific}$ value based at least in part on a position of the UE and a satellite position (e.g., a position of the NTN device), where the position of the UE may be estimated based at least in part on a current or most recent GNSS position fix, which the UE may update every few seconds (e.g., in 10 second intervals). The open-loop $N_{TA,UE\text{-}specific}$ value may be a TA calculation that is not based on feedback, as opposed to a closed-loop calculation. Accordingly, during the interval between GNSS position fixes, the UE location that the UE uses to calculate the UE-specific TA may be inaccurate (e.g., when the UE is in motion and has not performed a GNSS position fix). In some aspects, the inaccuracy in the UE location used to calculate the $N_{TA,UE\text{-}specific}$ value may be corrected in a closed-loop timing offset (e.g., a base station may measure the uplink reception timing error and transmit a TA command containing an $N_{TA}$ value that indicates a closed-loop timing offset to be used to calculate the overall TA that the UE is to apply for an uplink transmission). As a result, when the UE calculates a new open-loop $N_{TA,UE\text{-}specific}$ value following an updated GNSS position fix, the new $T_{TA}$ value may correct for a change in the UE location twice-once in the $N_{TA}$ value and another time in the $N_{TA,UE\text{-}specific}$ value. This may cause a double correction problem, whereby the TA (e.g., $T_{TA}$) that the UE applies to an uplink transmission after updating a GNSS position fix is calculated based at least in part on a closed-loop value (e.g., $N_{TA}$) and an open-loop value (e.g. $N_{TA,UE\text{-}specific}$) may double-correct for an error in the UE location.

Figure 8:
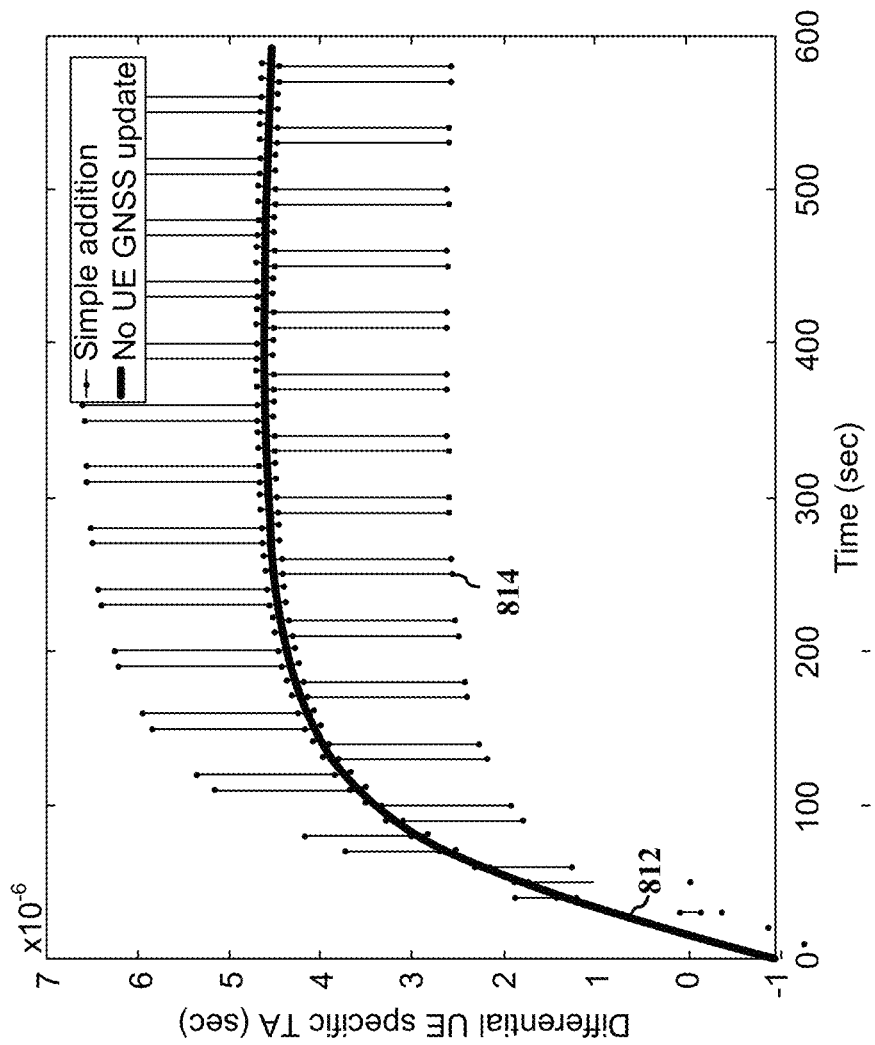
FIG. 8 illustrates another timing diagram showing differential UE specific TA values for communication between a UE and an NTN node.

In FIG. 8, graph 800 illustrates how updated GNSS position fixes may result in abrupt changes in uplink timing. For example, spike 814 may occur relative to curve 812, which each may represent a GNSS fix (e.g. update to an $N_{TA,UE\text{-}specific}$ value) or an update to an $N_{TA,common}$ value.

The abrupt changes that occur when the UE obtains updated GNSS position fixes may lead to spikes or jumps in uplink reception timing error at a base station in NTN. In some aspects, an abrupt change to the TA parameter (e.g., the $N_{TA,common}$ value, the model that gives $N_{TA,common}$), may lead to a double correction problem. In some aspects, a change to the UE GNSS location (e.g., via a GNSS position fix) and a change to the TA parameter may lead to the double correction problem. Applying such double-corrected values to generate the $T_{TA}$ that is applied to a UE transmission may be harmful, as the total TA itself may change too fast (e.g. as fast as 50 μs/sec). In some aspects, a spec may support adjustment up to 0.895 μs/sec for FR1, or 0.407 μs/sec for FR2.

A transmission timing error may occur in a plurality of scenarios. For example, a transmission timing error may occur for uplink transmissions that are sent when a UE is in a different position than its last known position, and the UE hasn't completed a position update process for an NTN node or device.

Figure 9B:
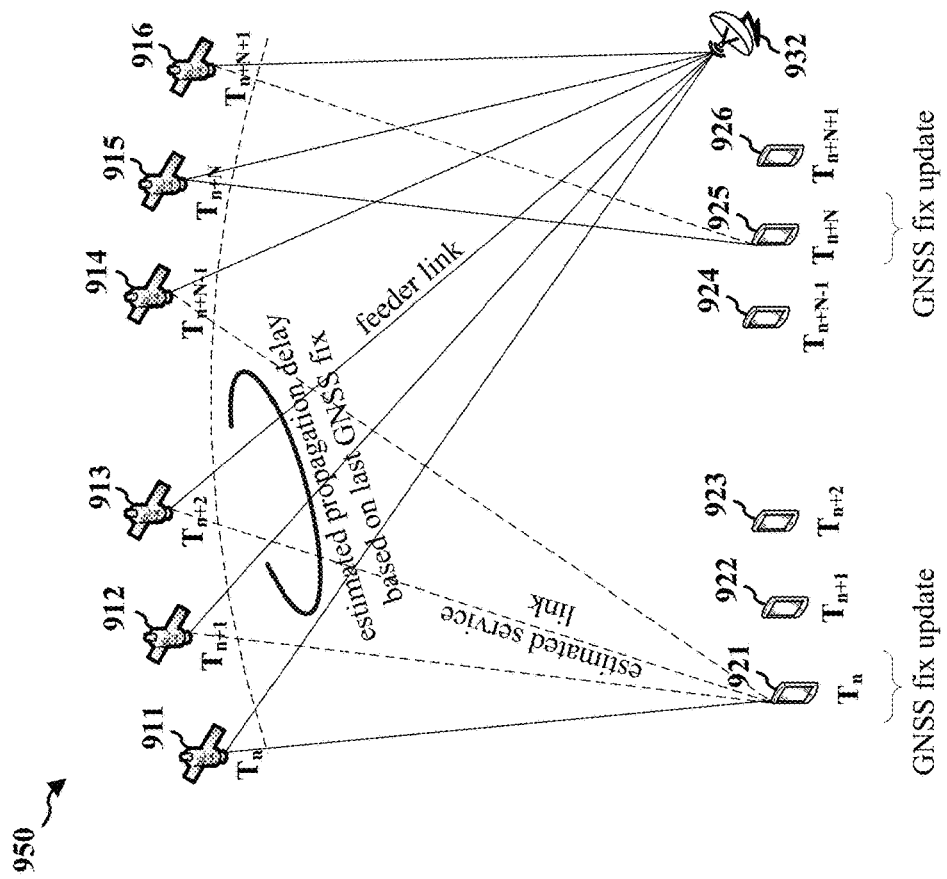
FIG. 9B shows a non-idealized NTN network 950 having a UE configured to perform a position update for every N slots.
Figure 9A:
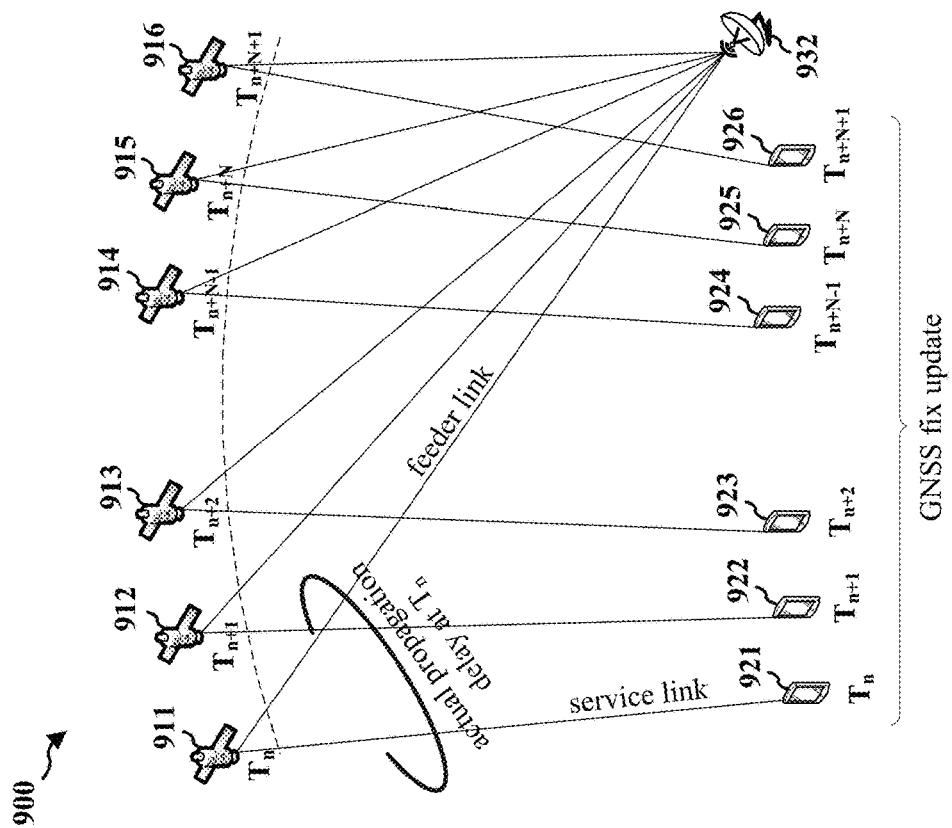
FIG. 9A shows an idealized NTN network having a UE configured to perform a position update for every uplink transmission to a network entity via an NTN device.

FIG. 9A shows an idealized NTN network 900 having a UE configured to perform a position update (e.g., GNSS fix update) for every uplink transmission to a network entity 932 via an NTN device. The UE moves from position 921 at $T_n$ to position 922 at $T_{n+1}$ to position 923 at $T_{n+2}$ to position 924 at $T_{n+N-1}$ to position 925 at $T_{n+N}$ to position 926 at $T_{n+N+1}$. Similarly, the NTN device moves from position 911 at $T_n$ to position 912 at $T_{n+1}$ to position 913 at $T_{n+2}$ to position 914 at $T_{n+N-1}$ to position 915 at $T_{n+N}$ to position 916 at $T_{n+N+1}$. In other words, at $T_n$, the UE at position 921 transmits an uplink transmission to the network entity 932 via the NTN device at position 911. At $T_{n+1}$, the UE at position 922 transmits an uplink transmission to the network entity 932 via the NTN device at position 912. At $T_{n+2}$, the UE at position 923 transmits an uplink transmission to the network entity 932 via the NTN device at position 913. At $T_{n+N-1}$, the UE at position 924 transmits an uplink transmission to the network entity 932 via the NTN device at position 914. At $T_{n+N}$, the UE at position 925 transmits an uplink transmission to the network entity 932 via the NTN device at position 915. At $T_{n+N+1}$, the UE at position 926 transmits an uplink transmission to the network entity 932 via the NTN device at position 916.

In the idealized NTN network 900, the UE performs a GNSS fix update for every uplink transmission, allowing for the UE to perfectly calculate an accurate $N_{TA,UE-specific}$ value for every uplink transmission, as it always knows its location relative to the NTN device. However, a GNSS fix update is a resource-intensive process to complete, consuming time, power, and bandwidth that may be used more efficiently on other tasks.

FIG. 9B shows a non-idealized NTN network 950 having a UE configured to perform a position update (e.g., a GNSS fix update) for every N slots. Similar to the idealized NTN network 900 in FIG. 9A, the UE in the non-idealized NTN network 950 also moves from position 921 at $T_n$ to position 922 at $T_{n+1}$ to position 923 at $T_{n+2}$ to position 924 at $T_{n+N-1}$ to position 925 at $T_{n+N}$ to position 926 at $T_{n+N+1}$. Similarly, the NTN device moves from position 911 at $T_n$ to position 912 at $T_{n+1}$ to position 913 at $T_{n+2}$ to position 914 at $T_{n+N-1}$ to position 915 at $T_{n+N}$ to position 916 at $T_{n+N+1}$. Again, at $T_n$, the UE at position 921 transmits an uplink transmission to the network entity 932 via the NTN device at position 911. At $T_{n+1}$, the UE at position 922 transmits an uplink transmission to the network entity 932 via the NTN device at position 912. At $T_{n+2}$, the UE at position 923 transmits an uplink transmission to the network entity 932 via the NTN device at position 913. At $T_{n+N-1}$, the UE at position 924 transmits an uplink transmission to the network entity 932 via the NTN device at position 914. At $T_{n+N}$, the UE at position 925 transmits an uplink transmission to the network entity 932 via the NTN device at position 915. At $T_{n+N+1}$, the UE at position 926 transmits an uplink transmission to the network entity 932 via the NTN device at position 916.

However, since the UE in a non-idealized NTN network 950 is configured to perform a GNSS fix update for every N slots, the UE in non-idealized NTN network 950 may only perform a GNSS fix update for the uplink transmission at $T_n$ and for the uplink transmission at $T_{n+N}$ (e.g., just before transmitting). For example, at $T_n$ the UE may be configured to estimate one way propagation delay over the service link and feeder link based on broadcasted ephemeris, $N_{TA,common}$ and epoch time and the position 921 of the UE.

While the UE may accurately estimate the service link distance at $T_n$ and at $T_{n+N}$, the UE may not accurately estimate the service link distance at $T_{n+1}$, $T_{n+2}$, $T_{n+N-1}$, and $T_{n+N+1}$. For example, the estimated service link distance may be longer than the actual service link distance at $T_{n+1}$, $T_{n+2}$, $T_{n+N-1}$, and $T_{n+N+1}$.

The UE in non-idealized NTN network 950 may be configured to use the last known GNSS fix location when estimating the service link between the UE and the NTN device. For example, at $T_{n+1}$, the UE may estimate its location to be at position 921, even though it is located at position 922. While the UE may correctly estimate the feeder link distance, the UE may incorrectly estimate the service link distance. This may affect the calculations that the UE makes to determine its $T_{TA}$ value, and more specifically its $N_{TA,UE-specific}$ value, which is used to determine its $T_{TA}$ value. The UE may be configured to determine its $N_{TA,UE-specific}$ value based on an estimate of the service link distance and an estimate of the feeder link distance. At $T_{n+2}$, $T_{n+N-1}$, and $T_{n+N+1}$, the UE of non-idealized NTN network 950 may similarly estimate the service link distance using its last known position, as it may not have an accurate current position.

At $T_{n+N}$ the UE may perform a position update and may then determine that a transmission timing error has occurred in its $T_{TA}$ value, and may then update its $N_{TA,UE-specific}$ value based on its updated location at position 925. However, by that time, the network entity 932 may have also detected the transmission timing error, and may have updated its $N_{TA}$ value to compensate for that timing error. Calculating the $N_{TA}$ based on the updated location of the UE at position 925 may cause a spike similar to spike 814 in FIG. 8, which may cause a transmission error if used.

A transmission timing error may also occur for uplink transmissions that are sent when a UE no longer has a direct line of sight (LoS) to an NTN device and has not compensated for a reflector.

Figures 10A, 10B:
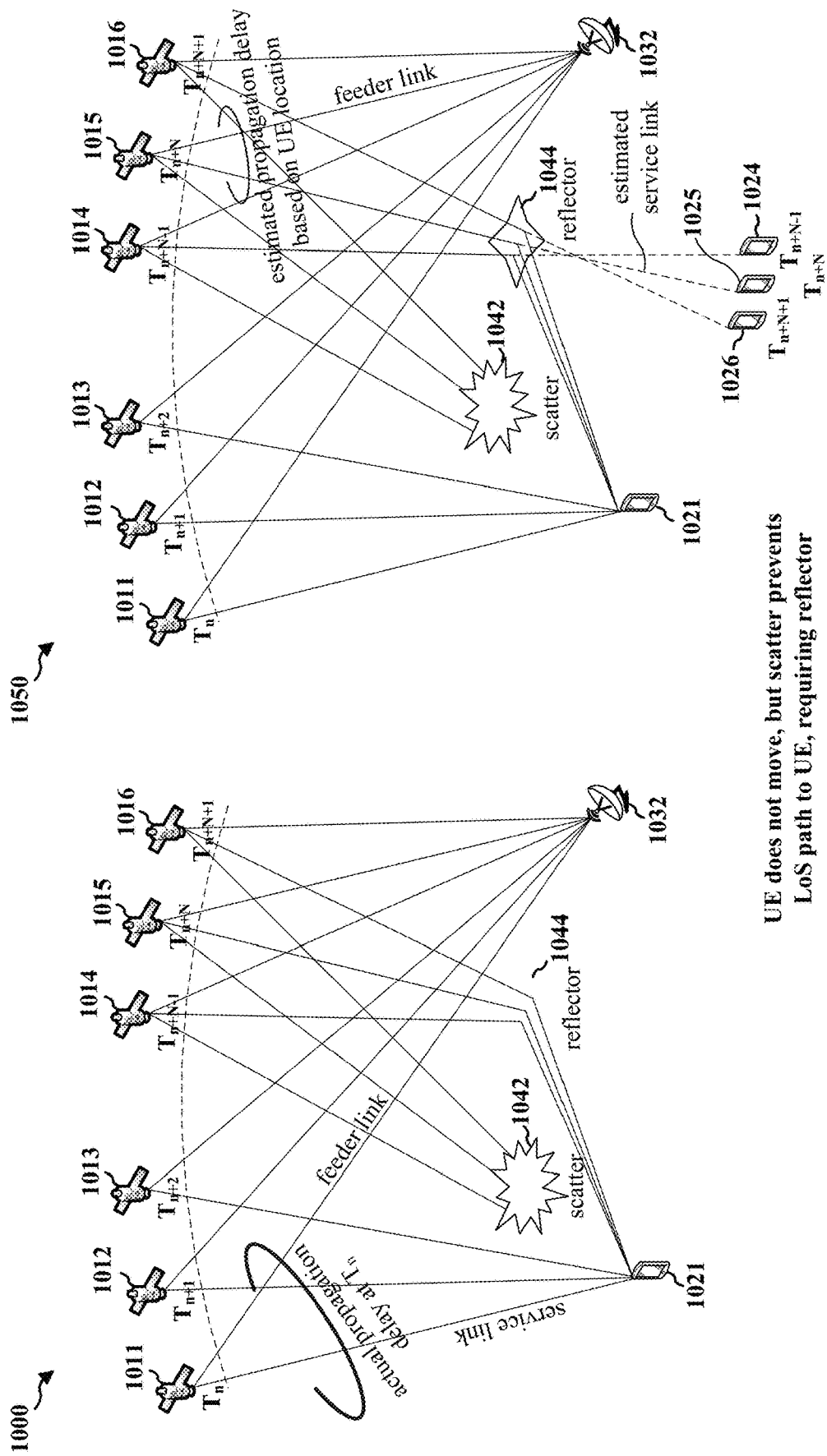
FIG. 10A shows a static UE position network having a UE that does not move from its position.
FIG. 10B shows the static UE position network of FIG. 10A estimated service links between the NTN device and the UE.

FIG. 10A shows a static UE position network 1000 having a UE that does not move from the position 1021. The UE transmits uplink transmissions to a network entity 1032 via an NTN device at $T_n$, $T_{n+1}$, $T_{n+2}$, $T_{n+N-1}$, $T_{n+N}$, and $T_{n+N+1}$. The NTN device moves from position 1011 at $T_n$ to position 1012 at $T_{n+1}$ to position 1013 at $T_{n+2}$ to position 1014 at $T_{n+N-1}$ to position 1015 at $T_{n+N}$ to position 1016 at $T_{n+N+1}$. While the UE has a direct LoS to the NTN device at $T_n$, $T_{n+1}$, and $T_{n+2}$, the UE does not have a direct LoS to the NTN device at $T_{n+N-1}$, $T_{n+N}$, and $T_{n+N+1}$. A scatter 1042 prevents the UE from having a direct LoS to the NTN device at $T_{n+N-1}$, $T_{n+N}$, and $T_{n+N+1}$.

A reflector 1044 may reflect a signal between the NTN device and the UE at $T_{n+N-1}$, $T_{n+N}$, and $T_{n+N+1}$.

FIG. 10B shows a static UE position network 1050 illustrating estimated service links between the NTN device and the UE at $T_{n+N-1}$, $T_{n+N}$, and $T_{n+N+1}$. For example, at $T_{n+N-1}$, the UE may estimate its position to be at position 1021 without using a reflector for transmissions, which may cause the UE to estimate a service link length at an effective position 1024. At $T_{n+N}$, the UE may estimate its position to be at position 1021 without using a reflector for transmissions, which may cause the UE to estimate a service link length at an effective position 1025. At $T_{n+N+1}$, the UE may estimate its position to be at position 1021 without using a reflector for transmissions, which may cause the UE to estimate a service link length at an effective position 1026. In other words, at $T_{n+N-1}$, $T_{n+N}$, and $T_{n+N+1}$, the LoS-based propagation delay estimation error may be equivalently modeled as a UE position estimation error. Here, the estimated service link distance may be shorter than the actual service link distance at $T_{n+N-1}$, $T_{n+N}$, and $T_{n+N+1}$.

Similar to the UE in a non-idealized NTN network 950, while the UE in static UE position network 1050 may correctly estimate the feeder link distance, the UE may incorrectly estimate the service link distance. This may affect the calculations that the UE makes to determine its $T_{TA}$ value, and more specifically its $N_{TA,UE-specific}$ value, which is used to determine its $T_{TA}$ value. The UE may be configured to determine its $N_{TA,UE-specific}$ value based on an estimate of the service link distance and an estimate of the feeder link distance.

The UE may detect that transmissions may be received from the NTN device through the reflector 1044, for example by comparing a sent time-stamp from the network entity 1032 to a received time-stamp at the UE at position 1021 to determine that the estimated service link is inaccurate. In response, the UE may account for the reflector 1044 in correcting its $T_{TA}$ value. However, by that time, the network entity 1032 may have also detected the transmission timing error, and may have updated its $N_{TA}$ value to compensate for that timing error. Calculating the $N_{TA}$ account for the reflector 1044 in correcting the $T_{TA}$ value of the UE may cause a spike similar to spike 814 in FIG. 8, which may cause a transmission error.

Figure 11:
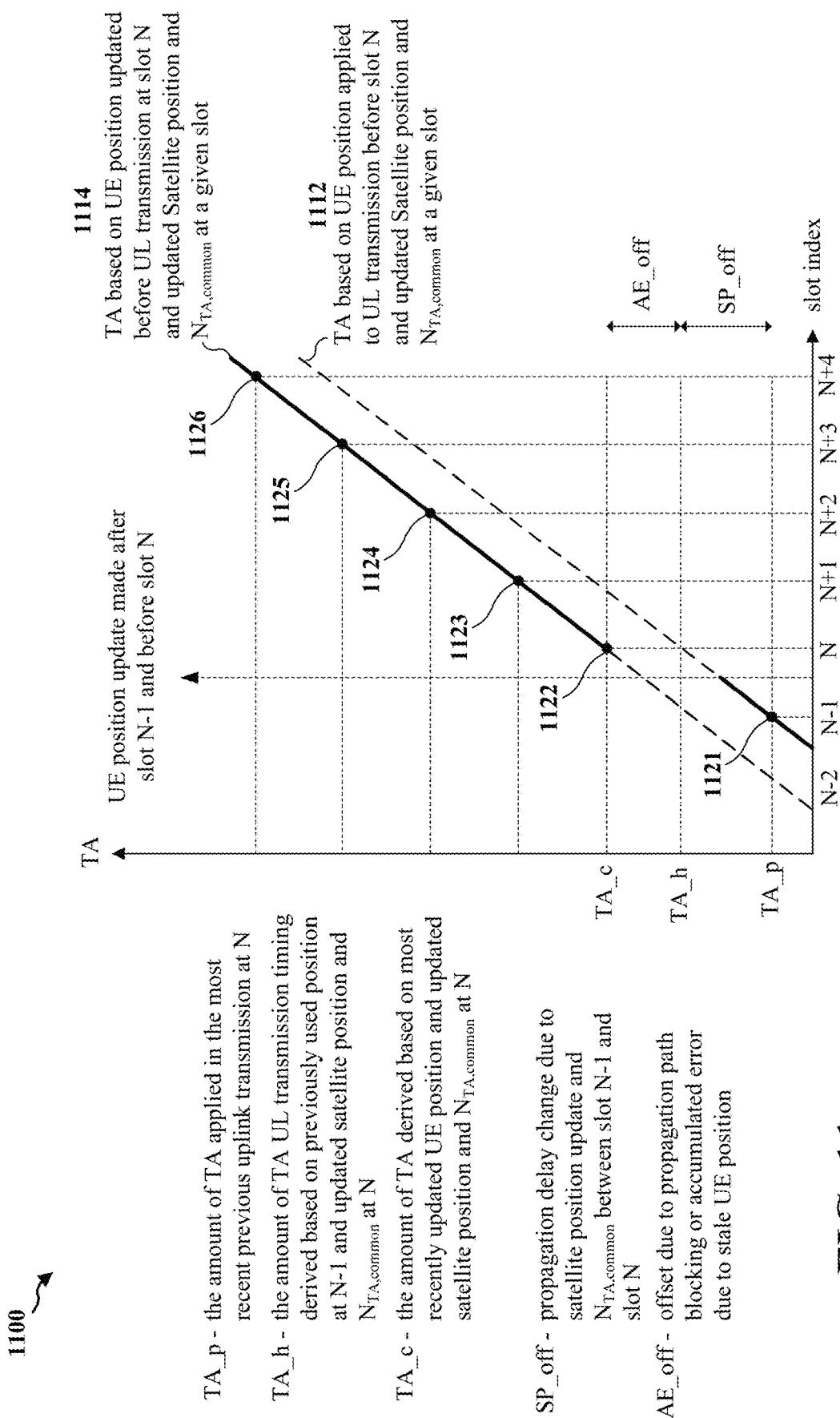
FIG. 11 shows a graph illustrating a sudden adjustment for an offset based on a corrected transmission timing error.

In FIG. 11, a graph 1100 illustrates a sudden adjustment for an offset based on a corrected transmission timing error. Graph 1100 shows a graph having an x-axis of a slot index moving from N−2 to N+4 one slot at a time, and a y-axis of a calculated TA based upon derived values, for example a $T_{TA}$ calculated as $(N_{TA}+N_{TA,UE\text{-}specific}+N_{TA,common}+N_{TA,offset}) \times T_C$. $T_C$ may represent a basic timing unit defined by a condition or a rule of a terrestrial network or an NTN. The line 1112 represents a calculated TA based on a previously known UE position, while the line 1114 represents a calculated TA based on an updated UE position determined between slot N−1 and slot N. In other words, the line 1112 may be a TA based on the UE position applied to an uplink transmission before slot N using an updated satellite position and $N_{TA,common}$ at each of the slots N−2 to N+4. The line 1114 may be a TA based on the UE position updated before an uplink transmission at slot N using an updated satellite position and $N_{TA,common}$ at each of the slots N−2 to N+4. The UE may be configured to suddenly adjust its TA for an offset based on its updated UE position.

At N−1, the UE may calculate a TA using line 1112 at point 1121, which provides a TA of TA_p. TA_p may represent a TA calculation based on a previously known position of the UE. Between N−1 and N, the UE may perform a position update, and may update its TA based upon newly derived values, for example a new position determined by a GNSS process. At N, the UE may calculate a TA using line 1114 (i.e., using the UE position update made after slot N−1 and before slot N) at point 1122, which provides a TA of TA_c. TA_c may represent the amount of TA derived based on a most recently updated UE position and updated satellite position and $N_{TA,common}$ at N.

The total difference between the TA at slot N−1 and the TA at slot N is TA_c−TA_p. However, the new position update performed by the UE may not account for the total difference between the TA at slot N−1 and the TA at slot N. TA_h shows an intersection of line 1112 at slot N, which may represent an amount of TA uplink transmission timing derived based on the previously updated UE position and updated satellite position and $N_{TA,common}$ at N. The difference between TA_h and TA_p is SP_off, which accounts for the propagation delay change to the TA due to a satellite position update and $N_{TA,common}$ between slot N−1 and slot N. The difference between TA_c and TA_h is AE_off, which accounts for the offset due to propagation path blocking or accumulated error due to stale UE position. In other words, the new position update performed by the UE accounts for the AE_off portion of the total difference between the TA at slot N−1 and the TA at slot N. In another aspect, AE_off may be considered the difference between $N_{TA,UE\text{-}specific\_new}$ from $N_{TA,UE\text{-}specific\_prev}$, where $N_{TA,UE\text{-}specific\_new}$ is the calculated $N_{TA,UE\text{-}specific}$ using the projected satellite position at N and the updated UE position at N, and $N_{TA,UE\text{-}specific\_prev}$ is the calculated $N_{TA,UE\text{-}specific}$ using the projected satellite position at N and the previous UE position at N−1.

At N, the UE may update its TA to TA_c using line 1114 at point 1122. From slot N forward, the UE may use line 1114, providing a TA update at point 1123 at N+1, at point 1124 at N+2, at point 1125 at N+3, and at point 1126 at N+4. However, by suddenly adjusting the TA based upon the updated UE position determined just before slot N, the UE may create a spike, such as spike 814 in FIG. 8, if the UE's sudden adjustment results in a double-correction problem.

Figure 12:
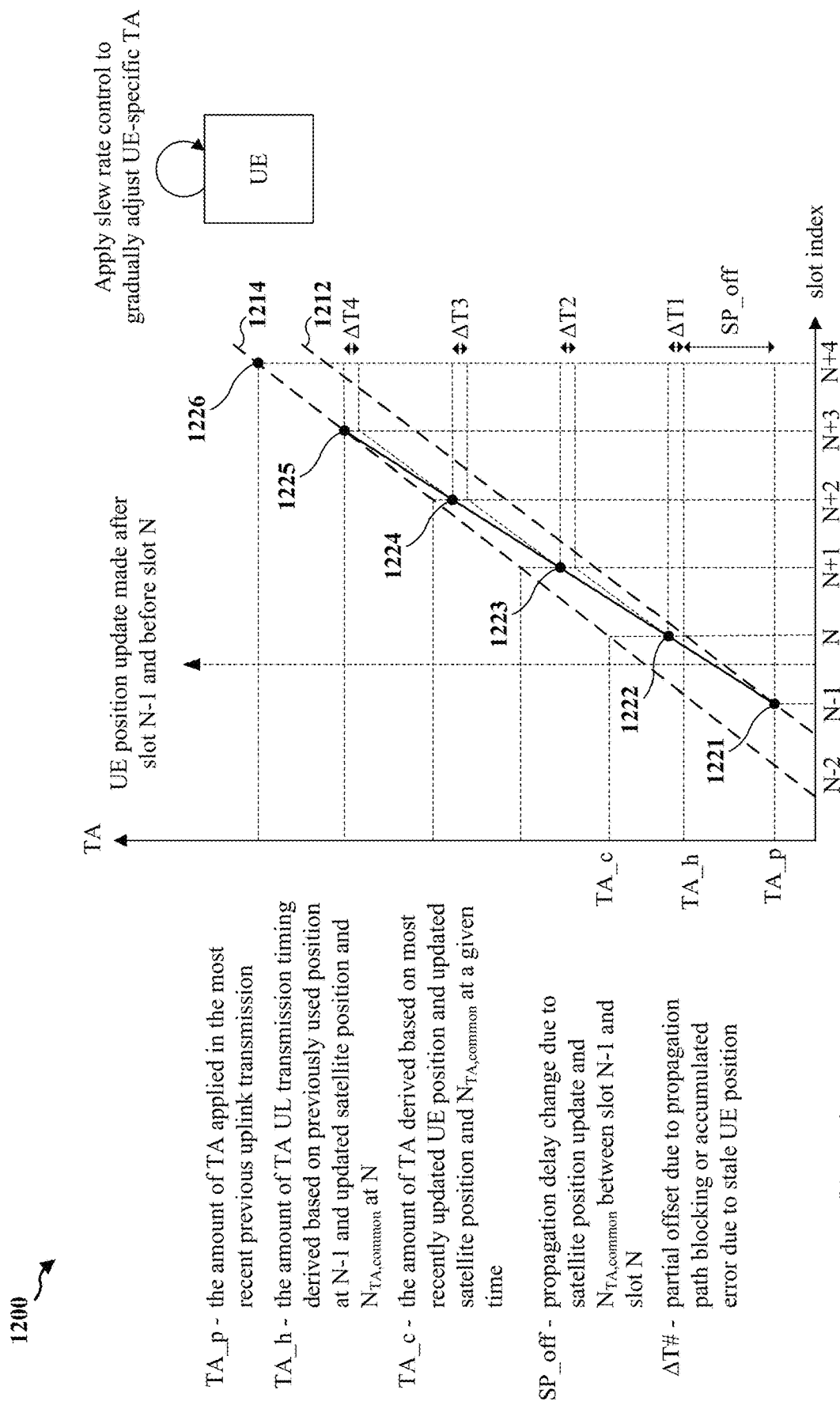
FIG. 12 shows a graph illustrating a gradual adjustment for an offset based on a corrected transmission timing error.

In FIG. 12, a graph 1200 illustrates a gradual adjustment for an offset based on a corrected transmission timing error. Similar to the graph 1100 in FIG. 11, graph 1200 shows a graph having an x-axis of a slot index moving from N−2 to N+4 one slot at a time, and a y-axis of a calculated TA based upon derived values. The line 1212 represents a calculated TA based on a previously known UE position, while the line 1214 represents a calculated TA based on an updated UE position determined between slot N−1 and slot N. However, instead of suddenly adjusting the TA for the UE based upon the entire offset due to propagation path blocking or accumulated error due to stale UE position (AE_off in FIG. 11), the UE may be configured to only use a portion of the offset due to propagation path blocking or accumulated error due to stale UE position. In other words, the UE may be configured to use a ΔT# value, which partially corrects the UE's offset over time instead of all at once.

Similar to the graph 1100 in FIG. 11, at N−1 in graph 1200, the UE may calculate a TA using line 1212 at point 1221, which provides a TA of TA_p. TA_p may represent a TA calculation based on a previously known position of the UE. Again, between N−1 and N, the UE may perform a position update, and may update its TA based upon newly derived values, for example a new position determined by a GNSS process. At N, the UE may calculate the TA_c value using line 1214 (i.e., using the UE position update made after slot N−1 and before slot N), but may only add a portion (ΔT1) of the difference between TA_c and TA_h (AE_off in FIG. 11) to the TA_h to get a new point (e.g., point 1222) that provides a modified TA value TA_d. In progressive slots, the UE may be configured to add another portion of the offset due to propagation path blocking or accumulated error due to stale UE position.

So between N−1 and N, the UE may be configured to add only ΔT1 and SP_off to move from point 1221 to point 1222, between N and N+1, the UE may be configured to add only ΔT2 and SP_off to move from point 1222 to point 1223, between N+1 and N+2, the UE may be configured to add only ΔT3 and SP_off to move from point 1223 to point 1224, between N+2 and N+3, the UE may be configured to add only ΔT4 and SP_off to move from point 1224 to point 1225, and between N+3 and N+4, the UE may be configured to add only SP_off to move from point 1225 to point 1226, as the entire offset due to propagation path blocking or accumulated error due to stale UE position may have been accounted for with the last ΔT# value.

By gradually adjusting the TA based upon adding only a portion of the calculated TA based upon the updated UE position determined just before slot N, the UE may avoiding create a spike, such as spike 814 in FIG. 8.

Any suitable timing adjustment system may be adapted for use with NTN devices. For example, a timing adjustment system may be configured to trigger when a transmission timing error between a UE and the reference timing exceeds a threshold value, such as ±Te. Te may include a timing error threshold value. The timing error threshold value may be defined by a condition or a rule of a terrestrial network or an NTN. In response to the transmission timing error meeting or exceeding a threshold value (e.g., ±Te), the UE may be configured to adjust its timing to within ±Te to prevent the change in the TA from being too large. The TA may be based on $TA=(N_{TA}+N_{TA,offset}) \times T_C$ before the downlink timing of the reference cell. The TA may be based on $TA=(N_{TA}+N_{TA,UE\text{-}specific}+N_{TA,common}+N_{TA,offset}) \times T_C$. The UE may be configured to calculate the TA such that a timing change between the reference TA and the corrected TA is within ±Te to prevent the change in the TA from being too large. The timing change may be configured to have a total timing adjustment that satisfies one or more threshold requirements. The threshold requirements may use threshold requirement values for Tq and Tp, such as those shown in Table 2 below. The threshold requirement values for Tq and Tp may be common to both a terrestrial network and an NTN.

TABLE 2

Frequency Range, SCS, Tq, and Tp

| Frequency Range | SCS of uplink signals (kHz) | Tq | Tp |
|---|---|---|---|
| 1 | 15 | 5.5 * 64 * Tc | 5.5 * 64 * Tc |
| 1 | 30 | 5.5 * 64 * Tc | 5.5 * 64 * Tc |
| 1 | 60 | 5.5 * 64 * Tc | 5.5 * 64 * Tc |
| 2 | 60 | K * 64 * Tc | 2.5 * 64 * Tc |
| 2 | 120 | K * 64 * Tc | 2.5 * 64 * Tc |
| 2 | 120 | 2.5 * 64 * Tc | 2.5 * 64 * Tc |
| 2 | 480 | [0.8] * 64 * Tc | [0.8] * 64 * Tc |
| 2 | 960 | [0.8] * 64 * Tc | [0.8] * 64 * Tc |

$T_C$ may represent a basic timing unit defined by a condition or a rule of a terrestrial network or an NTN. K may represent a value defined by a UE configuration. For example, a UE configured to support a power class 6 may have a K value of 4.5, while a UE configured to support other power classes may have a K value of 2.5. The UE may be configured to ensure that the maximum amount of magnitude of the timing change is configured to not exceed a Tq threshold value. If the difference between the corrected TA and the reference TA (i.e., the timing change) exceeds the Tq threshold value, the UE may be configured to set the new timing change to Tq. This would set the corrected TA to be the reference TA±Tq. The UE may be configured to add Tq if the corrected TA is greater than the reference TA, and subtract Tq if the corrected TA is less than the reference TA.

The UE may be configured to ensure that a minimum aggregate adjustment rate over a time period meets or exceeds a Tp per T1 second(s) threshold value. T1 may be any suitable value, for example 0.5, 1, or 2 s. For example, if T1 is 1 s, and if an aggregate of all timing changes within the previous second falls below the Tp threshold value, the UE may be configured to set the new timing change to be at least as large as Tp minus all previous timing changes within the previous second.

The UE may be configured to ensure that a maximum aggregate adjustment rate over a second period of time configured to not exceed a Tq per T2 millisecond (ms) threshold value. T2 may be any suitable value, for example 100, 200, or 400 ms. For example, if T2 is 200 ms, and if an aggregate of all timing changes within the previous 200 ms is above the Tq threshold value if added to the estimated timing change, the UE may be configured to set the new timing change to be at most the difference between Tq and the aggregate of all timing changes within the previous 200 ms.

While the timing adjustment system above may be used as a guideline for an NTN device, the average timing change for a UE that uses an NTN may be far greater than the average timing change for a UE that communicates with a terrestrial network. For example, the average timing change for a UE that uses an NTN may be more than 50 times greater than the average timing change for a UE that communicates with a terrestrial network. A majority of the timing changes for a UE that uses an NTN network may be due to the propagation delay change due to a satellite position update and $N_{TA,common}$, which is not as easily susceptible to transmission timing errors. Most transmission timing errors may be due to propagation path blocking or accumulated error due to use of a stale UE position. In other words, for graph 1100 in FIG. 11, a majority of the timing error for the UE between N−1 and N may be due to AE_off, and is not due to SP_off. Therefore, when measuring transmission timing errors of a UE that uses an NTN, an NTN timing adjustment system may not consider, or may remove or not include, the propagation delay adjustment due to an NTN node position update and a network-controlled common TA value (e.g. the propagation delay change due to a satellite position update and $N_{TA,common}$). This allows the NTN timing adjustment system be configured to allow for the UE to perform large NTN timing adjustments for propagation delay adjustments due to an NTN node position update or a network-controlled common TA value, and to perform gradual NTN timing adjustments for other transmission timing errors which may be susceptible to double-correction scenarios.

Figure 13:
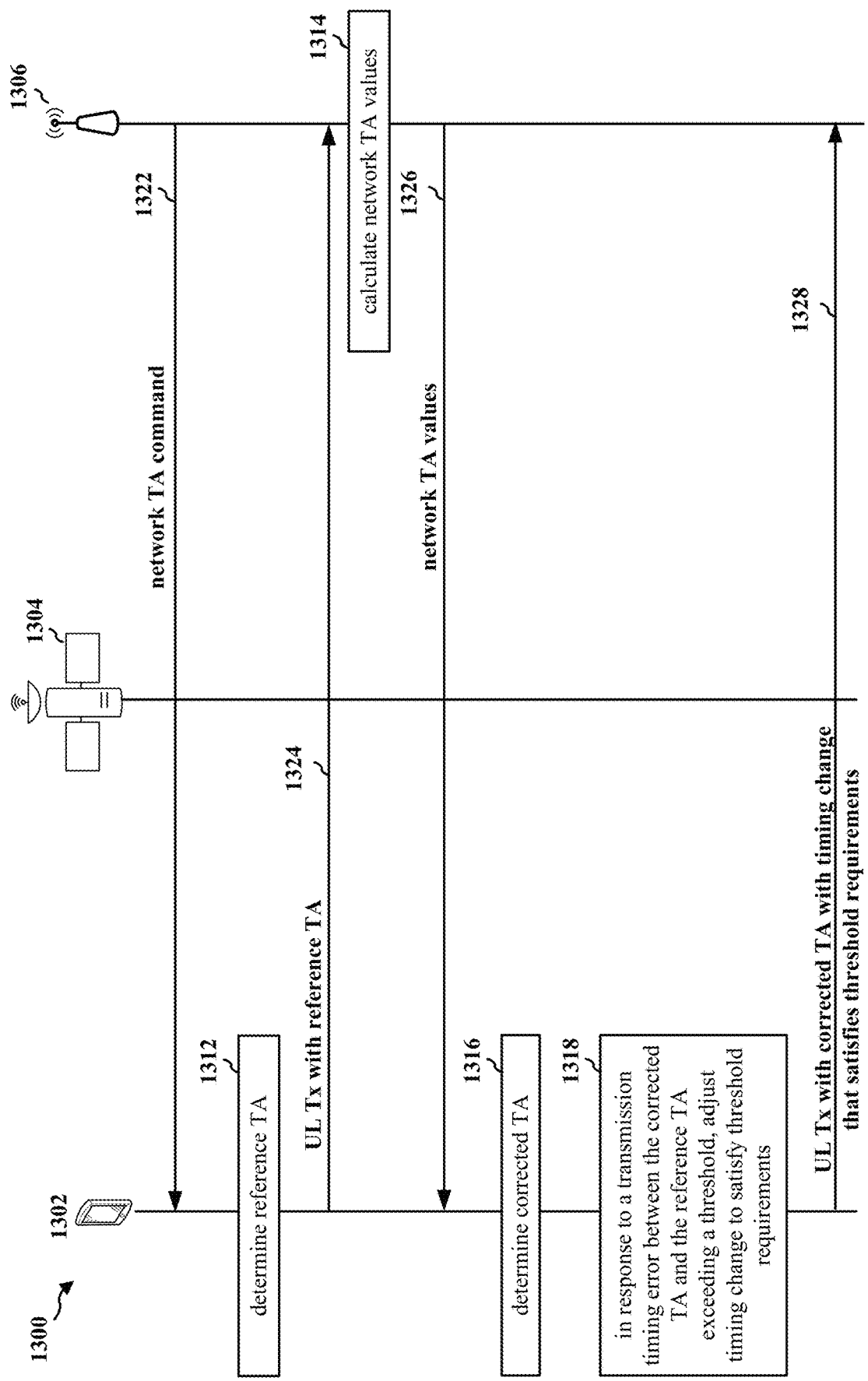
FIG. 13 shows a connection flow diagram having a UE configured to transmit an uplink transmission to a network entity via an NTN device.

In FIG. 13, a connection flow diagram 1300 has a UE 1302 configured to transmit an uplink transmission to a network entity 1306 via an NTN device 1304.

The network entity 1306 may be configured to transmit one or more TA commands 1322 to the UE 1302 to adjust the timing of an uplink transmission to compensate for propagation delay. In response, the UE 1302 may then be configured to adjust a timing of its uplink transmission signals, such as uplink transmission 1324 and uplink transmission 1328, to the network entity 1306 using a TA to compensate for propagation delay.

At 1312, the UE 1302 may determine a reference TA. Such a reference TA may be based on, for example, a $T_{TA}$ value based on $(N_{TA}+N_{TA,UE\text{-}specific}+N_{TA,common}+N_{TA,offset})\times T_C$. The reference TA may be $(N_{TA}+N_{TA,UE\text{-}specific}+N_{TA,common}+N_{TA,offset})\times T_C$ before the downlink timing of the reference cell. The $N_{TA,UE\text{-}specific}$ may be calculated, for example, based on an estimated position of the NTN device 1304, an estimated position of the UE 1302, and/or an estimated environment for a beam between the UE 1302 and the NTN device 1304 without propagation path blocking. The UE 1302 may be configured to transmit an uplink transmission 1324 to the network entity 1306 via the NTN device 1304 using the calculated reference TA.

At 1314, the network entity 1306 may be configured to calculate network TA values. Such values may include, for example, $N_{TA}$, $N_{TA,common}$, and/or $N_{TA,offset}$. For example, the network entity 1306 may detect an error in a calculation by the UE 1302 of the service link, and may add or subtract a delay from $N_{TA,common}$ or $N_{TA}$ to account for the network entity detected transmission timing error. The network entity 1306 may then transmit at least some of the network TA values 1326 to the UE 1302 for the UE to use in its calculations of a TA, for example a $T_{TA}$ value.

At 1316, the UE 1302 may determine a corrected TA. For example, the UE 1302 may perform a GNSS fix update to determine its position, has determined that the UE 1302 has moved from its last known position, and may update a location of the UE 1302 with its new GNSS-verified position. In another aspect the UE 1302 may determine that a previous transmission, such as the uplink transmission 1324, was blocked and was transmitted via a reflector, and an updated service link length should be used to calculate the $N_{TA,UE\text{-}specific}$.

At 1318, the UE 1302 may determine whether a timing difference between an uplink transmission and a reference timing exceeds a threshold, such as ±Te_NTN. The Te_NTN may be configured in any suitable manner, for example via an RRC configuration or a MAC CE or may be defined by a standard specification. The reference timing may be a TA value (e.g., $(N_{TA}+N_{TA,UE\text{-}specific}+N_{TA,common}+N_{TA,offset}) \times T_C$) before a downlink timing (e.g., the starting time of a received downlink slot K corresponding to the uplink transmission that targets reception at uplink slot K at the base station) of the cell. In response to determining that a transmission timing error between the uplink transmission and the reference timing exceeds the threshold, the UE 1302 may be configured to adjust the TA to satisfy threshold requirements. For example, where the UE 1302 is provided a Te_NTN, in response to determining that a timing change between the corrected TA and the reference TA exceeds ±Te_NTN, the UE 1302 be configured to adjust its TA, such as its $T_{TA}$, to be within ±Te_NTN. The corrected TA and the reference TA may both be $T_{TA}$ values based on $(N_{TA}+N_{TA,UE\text{-}specific}+N_{TA,common}+N_{TA,offset}) \times T_C$.

The UE 1302 may be configured to consider a subset of the timing change to determine whether the timing change satisfies one or more threshold requirements. For example, the UE 1302 may be configured to consider a timing change having a total timing adjustment other than a propagation delay adjustment due to an NTN node position update and a network-controlled common TA value. In one aspect, where the corrected TA is calculated as a $T_{TA}$ value based on $(N_{TA}+N_{TA,UE\text{-}specific}+N_{TA,common}+N_{TA,offset}) \times T_C$, the UE 1302 may be configured to not consider a change of $N_{TA,UE\text{-}specific}$ and $N_{TA,common}$. In some aspects, where the corrected TA is calculated as a $T_{TA}$ value based on $(N_{TA}+N_{TA,UE\text{-}specific}+N_{TA,common}+N_{TA,offset}) \times T_C$, the UE 1302 may be configured to not consider a change of the sum $(N_{TA,UE\text{-}specific}+N_{TA,common})$. In other words, the UE 1302 may be configured to not consider a change of $N_{TA,UE\text{-}specific}$ due to a satellite position update, and $N_{TA,common}$ between the previous transmission and the current transmission. In some aspects, where the corrected TA is calculated as a $T_{TA}$ value based on $(N_{TA}+N_{TA,UE\text{-}specific}+N_{TA,common}+N_{TA,offset}) \times T_C$, the UE 1302 may be configured to not consider a change of $(N_{TA,UE\text{-}specific}+N_{TA,common})$. In other words, the UE 1302 may be configured to not consider a change of $N_{TA,UE\text{-}specific}$ due to a satellite position update, and $N_{TA,common}$ between the previous transmission and the current transmission. In another aspect, the UE 1302 may be configured to first subtract $(N_{TA,UE\text{-}specific}+N_{TA,common})$ from $(N_{TA}+N_{TA,UE\text{-}specific}+N_{TA,common}+N_{TA,offset})$ before multiplying the remaining $(N_{TA}+N_{TA,offset})$ against $T_C$. In another aspect, the UE 1302 may be further configured to subtract $N_{TA,UE\text{-}specific\_new}$ from $N_{TA,UE\text{-}specific}$ prev where $N_{TA,UE\text{-}specific\_new}$ is the calculated $N_{TA,UE\text{-}specific}$ using a projected satellite position at a recent slot (e.g. at 1316) and the updated UE metrics at a recent slot, and $N_{TA,UE\text{-}specific}$ prev is the calculated $N_{TA,UE\text{-}specific}$ using the projected satellite position at a recent slot and the previous UE metrics at a past slot (e.g. at 1312). In other words, for graph 1100 in FIG. 11, the UE 1302 may be configured to consider the timing change to be the AE_off value calculated as the difference between TA_c and TA_h, and not the AE_off+SP_off value calculated as the difference between TA_c and TA_p.

The UE 1302 may be configured to ensure that the considered timing change, or subset of the timing change as discussed above, satisfies one or more threshold requirements common to the timing adjustment system described above. For example, the UE 1302 may be configured to ensure that the maximum amount of magnitude of the timing change is configured to not exceed a Tq threshold value. If the difference between the corrected TA and the reference TA (i.e., the timing change) exceeds the Tq threshold value, the UE may be configured to set the new timing change to Tq. The UE 1302 may be configured to calculate the maximum amount of magnitude of the timing change without considering a change of $N_{TA,UE\text{-}specific}$ due to a satellite position update, and $N_{TA,common}$ between the previous transmission and the current transmission. This may set the corrected $T_{TA}$ to be the reference $T_{TA}$±Tq. The UE 1302 may be configured to add Tq if the corrected TA is greater than the reference TA, and subtract Tq if the corrected TA is less than the reference TA.

In one aspect, when the UE 1302 is configured to ensure that the maximum amount of magnitude of the timing change between a future transmission and the transmission preceding the future transmission, apart from a change of $(N_{TA,UE\text{-}specific}+N_{TA,common})$ between the two transmissions, is configured not to exceed a Tq threshold value, the UE 1302 may also be configured to consider exclude considering the effect of any updates to the UE 1302's location and the common TA parameter signaled by the network (e.g., any coefficients signaled by the network and used by the UE in a model constructed based on a Taylor series for calculating $N_{TA,common}$), if such updates occur between the two transmissions.

The update of the common TA parameter may provide a different model for the UE to calculate the common TA in a future (i.e., $N_{TA,common}$). This new model and the old model may not be continuous at the time of update, which may cause a spike, such as the spike 814 in FIG. 8. The above-referenced configuration may be used to configure the UE 1302 to regulate such a spike. This may be achieved by: apart from a change, and the change excludes the spike→−(change−spike)=−change+spike.

The UE 1302 may be configured to ensure that a minimum aggregate adjustment rate over a time period meets or exceeds a Tp per T1 second threshold value. The UE 1302 may be configured to calculate the minimum aggregate adjustment rate without considering a change of $N_{TA,UE\text{-}specific}$ due to a satellite position update, and $N_{TA,common}$ during the previous T1 s. T1 may be any suitable value, for example 0.5, 1, or 2 s. For example, if T1 is 1 s, and if an aggregate of all timing changes within the previous second falls below the Tp threshold value, the UE may be configured to set the new timing change to be at least as large as Tp minus all previous timing changes within the previous second.

The UE 1302 may be configured to ensure that a maximum aggregate adjustment rate over a second period of time configured to not exceed a Tq per T2 ms threshold value. The UE 1302 may be configured to calculate the maximum aggregate adjustment rate without considering a change of $N_{TA,UE\text{-}specific}$ due to a satellite position update, and $N_{TA,common}$ during the previous T2 ms. T2 may be any suitable value, for example 100, 200, or 400. For example, if T2 is 200, and if an aggregate of all timing changes within the previous 200 ms is above the Tq threshold value if added to the estimated timing change, the UE may be configured to set the new timing change to be at most the difference between Tq and the aggregate of all timing changes within the previous 200 ms.

The UE 1302 may be configured to ensure that the considered timing change satisfies at least one of the threshold requirements. In one aspect, the UE 1302 may be configured to ensure that the considered timing change satisfies all of the threshold requirements. The UE 1302 may be configured to transmit an uplink transmission 1328 to the network entity 1306 via the NTN device 1304 using the updated corrected TA having a timing change that satisfies the threshold requirements. In some aspects, the UE 1302 may be configured to ensure that future transmission timing errors have timing changes that satisfy the same threshold requirements.

Figure 14:
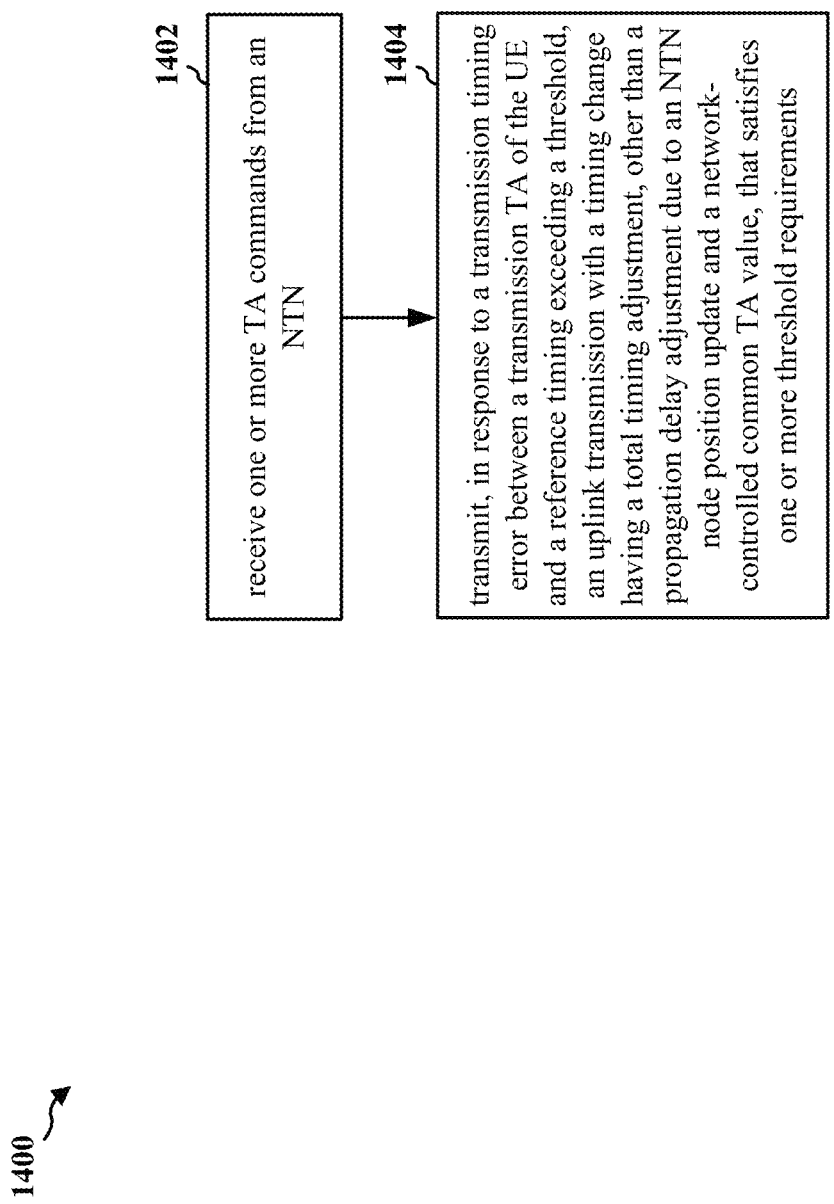
FIG. 14 is a flowchart of a method of wireless communication, in accordance with various aspects of the present disclosure.

FIG. 14 is a flowchart depicting example operations 1400 for wireless communication. The operations may be performed by a UE (e.g., the UE 104, UE 350, UE 404, UE 505, UE 630, UE 1302; the apparatus 1504) or a component at a UE. The method may improve timing adjustment at a UE for communication with an NTN, and may help to avoid overcorrection or dual compensation by gradually adjusting timing while allowing for timing adjustment based on a known position change of an NTN node, such as a satellite.

At 1402, the UE may receive one or more TA commands from an NTN. For example, the UE 1302 in FIG. 13 may receive one or more TA commands 1322 from the network entity 1306. For example, $N_{TA}$ may include a cumulative timing advance value based on an accumulation of the one or more timing advance commands from the NTN. In some aspects, 1402 may be performed by the TA component 198 in FIG. 15.

At 1404, the UE transmit, in response to a transmission timing error between a transmission TA of the UE and a reference timing exceeding a threshold, an uplink transmission with a timing change having a total timing adjustment, other than a propagation delay adjustment due to an NTN node position update and a network-controlled common TA value, that satisfies one or more threshold requirements. For example, the UE 1302 in FIG. 13 may determine a corrected TA at 1316 and a reference TA at 1312. The difference between the corrected TA at 1316 and the reference TA at 1312 may be considered a transmission timing error. In response to the transmission timing error exceeding a threshold, the UE 1302 may ensure that a timing change having a total timing adjustment, other than a propagation delay adjustment due to an NTN node position update and a network-controlled common TA value, that satisfies one or more threshold requirements at 1318. The UE 1302 may transmit an uplink transmission 1328 with the timing change having a total timing adjustment that satisfies one or more of the threshold requirements to the network entity 1306 via the NTN device 1304.

The one or more threshold requirements may include at least one of: a maximum amount of magnitude of the timing change not exceeding a first threshold value, a minimum aggregate adjustment rate over a first period of time meeting or exceeding a second threshold value, or a maximum aggregate adjustment rate over a second period of time not exceeding a third threshold value. The one or more of the maximum amount of magnitude, the minimum aggregate adjustment rate, or the maximum aggregate adjustment rate each have a threshold common to a threshold for terrestrial network communication. For example, the thresholds may be the same for an NTN and a terrestrial network.

For example, the timing change without the propagation delay adjustment due to an NTN node position update and without the network-controlled common timing advance value may not exceed a maximum magnitude threshold value. The maximum magnitude threshold value may be Tq, for example. As another example, an aggregate of the timing change without the propagation delay adjustment due to an NTN node position update and without the network-controlled common timing advance value added to a set of historical timing changes over a first period of time may meet or exceed a minimum aggregate threshold value. The minimum aggregate threshold value may be Tp, for example. As another example, an aggregate of the timing change without the propagation delay adjustment due to an NTN node position update and without the network-controlled common timing advance value added to a set of historical timing changes over a first period of time may not exceed a maximum aggregate threshold value. The maximum aggregate threshold value may be Tq, for example.

As another example, the reference timing may be based on $(N_{TA}+N_{TA,UE\text{-}specific}+N_{TA,common}+N_{TA,offset}) \times T_C$ before a downlink timing of a reference cell. $N_{TA}$ may include a cumulative timing advance value based on an accumulation of the one or more timing advance commands from the NTN. $N_{TA,UE\text{-}specific}$ may include a self-estimated timing advance amount for the UE that pre-compensates for a service link delay. $N_{TA,common}$ may include a network-controlled common timing advance value. $N_{TA,offset}$ may include a fixed offset. $T_C$ may include a fixed value defined by a network, such as a terrestrial network or an NTN. The timing change without $N_{TA,UE\text{-}specific}+N_{TA,Common}$ may be less than a maximum amount of magnitude threshold value. An aggregate of the timing change without $N_{TA,UE\text{-}specific}+N_{TA,Common}$ added to a set of historical timing changes over a period of time may meet or exceed a minimum aggregate adjustment rate threshold value. An aggregate of the timing change without $N_{TA,UE\text{-}specific}+N_{TA,Common}$ added to a set of historical timing changes over a period of time may not exceed a maximum aggregate adjustment rate threshold value.

FIG. 15 is a diagram 1500 illustrating an example of a hardware implementation for an apparatus 1504 and a network entity 1502. The apparatus 1504 may be a UE, a component of a UE, or may implement UE functionality. The network entity 1502 may be a BS, a component of a BS, or may implement BS functionality. The apparatus 1504 may communicate with the network via an NTN device 103, such as described in connection with any of FIGS. 1, 4, 5A-C. In some aspects, the apparatus 1504 may include a cellular baseband processor 1524 (also referred to as a modem) coupled to a cellular RF transceiver 1522. In some aspects, the apparatus 1504 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1524 communicates through the cellular RF transceiver 1522 with the UE 104 and/or with an RU associated with the network entity 1502. The RU is either part of the network entity 1502 or is in communication with the network entity 1502. The network entity 1502 may include one or more of the CU, DU, and the RU. The cellular baseband processor 1524 and the application processor 1506 may each include a computer-readable medium/memory. Each computer-readable medium/memory may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the Tx processor 368, the Rx processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 is configured to receive one or more TA commands from an NTN. In response to a transmission timing error between a transmission TA of the UE and a reference timing exceeding a threshold, the component 198 may be configured to transmit an uplink transmission with a timing change having a total timing adjustment, other than a propagation delay adjustment due to an NTN node position update and a network-controlled common TA value, that satisfies one or more threshold requirements. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving one or more TA commands from an NTN, and means for transmitting, in response to a transmission timing error between a transmission TA of the UE and a reference timing exceeding a threshold, an uplink transmission with a timing change having a total timing adjustment, other than a propagation delay adjustment due to an NTN node position update and a network-controlled common TA value, that satisfies one or more threshold requirements. The means may be the component 198 of the apparatus 1504 configured to perform the functions recited by the means. As described supra, the apparatus 1504 may include the Tx processor 368, the Rx processor 356, and the controller/processor 359. As such, in one configuration, the means may be the Tx processor 368, the Rx processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for wireless communication, including receiving one or more TA commands from an NTN. The method may further include transmitting, in response to a transmission timing error between a transmission TA of the UE and a reference timing exceeding a threshold, an uplink transmission with a timing change having a total timing adjustment, other than a propagation delay adjustment due to an NTN node position update and a network-controlled common TA value, that satisfies one or more threshold requirements.

Aspect 2 is the method of aspect 1, where the one or more threshold requirements may include at least one of (1) a maximum amount of magnitude of the timing change configured to not exceed a first threshold value, (2) a minimum aggregate adjustment rate over a first period of time configured to meet or exceed a second threshold value, or (3) a maximum aggregate adjustment rate over a second period of time configured to not exceed a third threshold value.

Aspect 3 is the method of aspect 2, where one or more of the maximum amount of magnitude, the minimum aggregate adjustment rate, or the maximum aggregate adjustment rate may have a threshold requirement value common to a threshold value for terrestrial network communication.

Aspect 4 is a method of any of aspects 1 to 3, where the reference timing may be based on $(N_{TA}+N_{TA,UE\text{-}specific}+N_{TA,common}+N_{TA,offset}) \times T_C$ before a downlink timing of a reference cell. $N_{TA}$ may include a cumulative TA value based on an accumulation of the one or more TA commands from the NTN. $N_{TA,UE\text{-}specific}$ may include a self-estimated TA amount for the UE that pre-compensates for a service link delay. $N_{TA,common}$ may include a network-controlled common TA value. $N_{TA,offset}$ may include a fixed offset. $T_C$ may include a fixed value.

Aspect 5 is a method of any of aspects 1 to 4, where the timing change without the propagation delay adjustment due to the NTN node position update and without the network-controlled common TA value may be configured to not exceed a maximum amount of magnitude threshold value.

Aspect 6 is a method of aspect 5, where the propagation delay adjustment further does not include an effect of any updates to a location of the UE or the network-controlled common TA value if the location of the UE changes between the transmission TA of the UE and the reference timing.

Aspect 7 is a method of aspect 5, where the propagation delay adjustment further does not include an effect of any updates to a location of the UE or a network-controlled common TA value if a parameter of the network-controlled common TA value changes between the transmission TA of the UE and the reference timing.

Aspect 8 is a method of any of aspects 1 to 7, where an aggregate of the timing change without the propagation delay adjustment due to the NTN node position update and without the network-controlled common TA value added to a set of historical timing changes over a first period of time may be configured to meet or exceed a minimum aggregate adjustment rate threshold value.

Aspect 9 is a method of any of aspects 1 to 8, where an aggregate of the timing change without the propagation delay adjustment due to an NTN node position update and without the network-controlled common TA value added to a set of historical timing changes over a first period of time may be configured to not exceed a maximum aggregate threshold value.

Aspect 10 is an apparatus for wireless communications, including: a memory; instructions; and one or more processors configured to execute the instructions and cause the apparatus to perform a method in accordance with any one of aspects 1 to 9.

In aspect 11, the apparatus of aspect 10 further includes at least one of a transceiver or an antenna.

Aspect 12 is an apparatus for wireless communications, including means to perform any of aspects 1-9.

In aspect 13, the apparatus of aspect 12 further includes at least one of a transceiver or an antenna.

Aspect 14 is a non-transitory computer-readable medium including instructions that, when executed by an apparatus, cause the apparatus to perform a method in accordance with any one of aspects 1 to 9.

What is claimed is:

1. An apparatus for wireless communication at a user equipment (UE), comprising:
   memory comprising instructions; and
   at least one processor coupled to the memory and, based at least in part on the instructions stored in the memory, the at least one processor is configured to:
   receive one or more timing advance (TA) commands from a non-terrestrial network (NTN);
   adjust, in response to a transmission timing difference between a transmission TA of the UE and a reference TA exceeding a threshold, a timing change having a total timing adjustment, other than a propagation delay adjustment based on an NTN node position update and a network-controlled common TA value, to satisfy one or more threshold requirements; and
   transmit an uplink transmission based on the adjusted timing change.

2. The apparatus of claim 1, further comprising a transceiver, wherein the one or more threshold requirements comprise at least one of:
   a maximum amount of magnitude of the adjusted timing change configured to not exceed a first threshold value,
   a minimum aggregate adjustment rate over a first period of time associated with the adjusted timing change configured to meet or exceed a second threshold value, or
   a maximum aggregate adjustment rate over a second period of time associated with the adjusted timing change configured to not exceed a third threshold value.

3. The apparatus of claim 2, wherein one or more of the maximum amount of magnitude, the minimum aggregate adjustment rate, or the maximum aggregate adjustment rate has a threshold requirement value common to a threshold value for terrestrial network communication.

4. The apparatus of claim 1, wherein the adjusted timing change having the total timing adjustment, other than the propagation delay adjustment based on the NTN node position update and the network-controlled common TA value, is configured to not exceed a maximum amount of magnitude threshold value.

5. The apparatus of claim 4, wherein the total timing adjustment further does not include an effect of any updates to a location of the UE or the network-controlled common TA value if the location of the UE changes between the transmission TA of the UE and the reference TA.

6. The apparatus of claim 4, wherein the total timing adjustment further does not include an effect of any updates to a location of the UE or the network-controlled common TA value if a parameter of the network-controlled common TA value changes between the transmission TA of the UE and the reference TA.

7. The apparatus of claim 1, wherein an aggregate of the total timing adjustment, other than the propagation delay adjustment based on the NTN node position update and the network-controlled common TA value, added to a set of historical timing changes over a first period of time is configured to meet or exceed a minimum aggregate adjustment rate threshold value.

8. The apparatus of claim 1, wherein an aggregate of the total timing adjustment, other than the propagation delay adjustment based on the NTN node position update and the network-controlled common TA value, added to a set of historical timing changes over a first period of time is configured to not exceed a maximum aggregate threshold value.

9. The apparatus of claim 1, wherein the reference TA timing is based on $(N_{TA}+N_{TA,UE\text{-}specific}+N_{TA,common}+N_{TA,offset}) \times T_C$ before a downlink timing of a reference cell, where $N_{TA}$ comprises a cumulative TA value based on an accumulation of the one or more TA commands from the NTN, $N_{TA,UE\text{-}specific}$ comprises a self-estimated TA amount for the UE that pre-compensates for a service link delay, $N_{TA,common}$ comprises the network-controlled common TA value, $N_{TA,offset}$ comprises a fixed offset, and $T_C$ comprises a fixed value.

10. The apparatus of claim 9, wherein the total timing adjustment, other than $N_{TA,UE\text{-}specific}+N_{TA,Common}$, is less than a maximum amount of magnitude threshold value.

11. The apparatus of claim 9, wherein an aggregate of the total timing adjustment, other than $N_{TA,UE\text{-}specific}+N_{TA,Common}$, added to a set of historical timing changes over a first period of time meets or exceeds a minimum aggregate adjustment rate threshold value.

12. The apparatus of claim 9, wherein an aggregate of the total timing adjustment, other than $N_{TA,UE\text{-}specific}+N_{TA,Common}$, added to a set of historical timing changes over a first period of time does not exceed a maximum aggregate adjustment rate threshold value.

13. A method of wireless communication at a user equipment (UE), comprising:
receiving one or more timing advance (TA) commands from a non-terrestrial network (NTN);
adjusting, in response to a transmission timing difference between a transmission TA of the UE and a reference TA exceeding a threshold, a timing change having a total timing adjustment, other than a propagation delay adjustment based on an NTN node position update and a network-controlled common TA value, to satisfy one or more threshold requirements; and
transmitting an uplink transmission based on the adjusted timing change.

14. The method of claim 13, wherein the one or more threshold requirements comprise at least one of:
a maximum amount of magnitude of the adjusted timing change configured to not exceed a first threshold value,
a minimum aggregate adjustment rate over a first period of time associated with the adjusted timing change configured to meet or exceed a second threshold value, or
a maximum aggregate adjustment rate over a second period of time associated with the adjusted timing change configured to not exceed a third threshold value.

15. The method of claim 14, wherein one or more of the maximum amount of magnitude, the minimum aggregate adjustment rate, or the maximum aggregate adjustment rate has a threshold requirement value common to a threshold value for terrestrial network communication.

16. The method of claim 13, wherein the reference TA is based on $(N_{TA}+N_{TA,UE\text{-}specific}+N_{TA,common}+N_{TA,offset})\times T_C$ before a downlink timing of a reference cell, where $N_{TA}$ comprises a cumulative TA value based on an accumulation of the one or more TA commands from the NTN, $N_{TA,UE\text{-}specific}$ comprises a self-estimated TA amount for the UE that pre-compensates for a service link delay, $N_{TA,common}$ comprises the network-controlled common TA value, $N_{TA,offset}$ comprises a fixed offset, and $T_C$ comprises a fixed value.

17. The method of claim 13, wherein the adjusted timing change having the total timing adjustment, other than the propagation delay adjustment based on the NTN node position update and the network-controlled common TA value, is configured to not exceed a maximum amount of magnitude threshold value.

18. The method of claim 17, wherein the total timing adjustment further does not include an effect of any updates to a location of the UE or the network-controlled common TA value if the location of the UE changes between the transmission TA of the UE and the reference TA timing.

19. The method of claim 17, wherein the total timing adjustment further does not include an effect of any updates to a location of the UE or the network-controlled common TA value if a parameter of the network-controlled common TA value changes between the transmission TA of the UE and the reference TA.

20. The method of claim 13, wherein an aggregate of the total timing adjustment, other than the propagation delay adjustment based on the NTN node position update and the network-controlled common TA value, added to a set of historical timing changes over a first period of time is configured to meet or exceed a minimum aggregate adjustment rate threshold value.

21. The method of claim 13, wherein an aggregate of the total timing adjustment, other than the propagation delay adjustment based on the NTN node position update and the network-controlled common TA value, added to a set of historical timing changes over a first period of time is configured to not exceed a maximum aggregate threshold value.

22. An apparatus for wireless communications at a user equipment (UE), comprising:
means to receive one or more timing advance (TA) commands from a non-terrestrial network (NTN);
means to adjust, in response to a transmission timing difference between a transmission TA of the UE and a reference TA exceeding a threshold, a timing change having a total timing adjustment, other than a propagation delay adjustment based on an NTN node position update and a network-controlled common TA value, to satisfy one or more threshold requirements; and
means to transmit an uplink transmission based on the adjusted timing change.

23. The apparatus of claim 22, further comprising a transceiver, wherein the one or more threshold requirements comprise at least one of:
a maximum amount of magnitude of the adjusted timing change configured to not exceed a first threshold value,
a minimum aggregate adjustment rate over a first period of time associated with the adjusted timing change configured to meet or exceed a second threshold value, or
a maximum aggregate adjustment rate over a second period of time associated with the adjusted timing change configured to not exceed a third threshold value.

24. The apparatus of claim 23, wherein one or more of the maximum amount of magnitude, the minimum aggregate adjustment rate, or the maximum aggregate adjustment rate has a threshold requirement value common to a threshold value for terrestrial network communication.

25. The apparatus of claim 22, wherein the reference TA timing is based on $(N_{TA}+N_{TA,UE\text{-}specific}+N_{TA,common}+N_{TA,offset})\times T_C$ before a downlink timing of a reference cell, where $N_{TA}$ comprises a cumulative TA value based on an accumulation of the one or more TA commands from the NTN, $N_{TA,UE\text{-}specific}$ comprises a self-estimated TA amount for the UE that pre-compensates for a service link delay, $N_{TA,common}$ comprises the network-controlled common TA value, $N_{TA,offset}$ comprises a fixed offset, and $T_C$ comprises a fixed value.

26. The apparatus of claim 22, wherein the adjusted timing change having the total timing adjustment, other than the propagation delay adjustment based on the NTN node position update and the network-controlled common TA value, is configured to not exceed a maximum amount of magnitude threshold value.

27. A non-transitory computer-readable medium comprising instructions that, when executed by an apparatus, cause the apparatus to:
- receive one or more timing advance (TA) commands from a non-terrestrial network (NTN);
- adjust, in response to a transmission timing difference between a transmission TA of a user equipment (UE) and a reference TA exceeding a threshold, a timing change having a total timing adjustment, other than a propagation delay adjustment based on an NTN node position update and a network-controlled common TA value, to satisfy one or more threshold requirements; and
- transmit an uplink transmission based on the adjusted timing change.

28. The non-transitory computer-readable medium of claim 27, wherein the one or more threshold requirements comprise at least one of:
- a maximum amount of magnitude of the timing change configured to not exceed a first threshold value,
- a minimum aggregate adjustment rate over a first period of time configured to meet or exceed a second threshold value, or
- a maximum aggregate adjustment rate over a second period of time configured to not exceed a third threshold value.

29. The non-transitory computer-readable medium of claim 28, wherein the adjusted timing change having the total timing adjustment, other than the propagation delay adjustment based on the NTN node position update and the network-controlled common TA value, is configured to not exceed a maximum amount of magnitude threshold value.

30. The non-transitory computer-readable medium of claim 27, wherein the reference TA is based on $(N_{TA}+N_{TA,UE\text{-}specific}+N_{TA,common}+N_{TA,offset}) \times T_C$ before a downlink timing of a reference cell, where $N_{TA}$ comprises a cumulative TA value based on an accumulation of the one or more TA commands from the NTN, $N_{TA,UE\text{-}specific}$ comprises a self-estimated TA amount for the UE that pre-compensates for a service link delay, $N_{TA,common}$ comprises the network-controlled common TA value, $N_{TA,offset}$ comprises a fixed offset, and $T_C$ comprises a fixed value.

* * * * *